US007979586B2

(12) United States Patent
Gobara et al.

(10) Patent No.: US 7,979,586 B2
(45) Date of Patent: *Jul. 12, 2011

(54) INFORMATION PROCESSING SYSTEM, INFORMATION PROCESSOR, SERVER, INFORMATION PROCESSING METHOD AND PROGRAM

(75) Inventors: Kunio Gobara, Tokyo (JP); Hajime Maekawa, Osaka (JP)

(73) Assignee: Panasonic Corporation, Osaka (JP)

( * ) Notice: Subject to any disclaimer, the term of this patent is extended or adjusted under 35 U.S.C. 154(b) by 990 days.

This patent is subject to a terminal disclaimer.

(21) Appl. No.: 11/816,927

(22) PCT Filed: Sep. 14, 2005

(86) PCT No.: PCT/JP2005/016934
§ 371 (c)(1),
(2), (4) Date: Aug. 23, 2007

(87) PCT Pub. No.: WO2006/090500
PCT Pub. Date: Aug. 31, 2006

(65) Prior Publication Data
US 2009/0219943 A1 Sep. 3, 2009

(30) Foreign Application Priority Data
Feb. 25, 2005 (JP) .................... 2005-050411

(51) Int. Cl.
*G06F 15/16* (2006.01)
(52) U.S. Cl. ....................................... 709/250
(58) Field of Classification Search .................. 709/229, 709/250
See application file for complete search history.

(56) References Cited

U.S. PATENT DOCUMENTS

| 6,038,606 | A | * | 3/2000 | Brooks et al. ............... 709/235 |
| 6,219,736 | B1 | * | 4/2001 | Klingman ...................... 710/315 |
| 6,330,008 | B1 | * | 12/2001 | Razdow et al. ............... 709/230 |
| 6,654,810 | B1 | * | 11/2003 | Pierre et al. ................... 709/232 |
| 7,283,476 | B2 | * | 10/2007 | Bare ............................... 709/220 |
| 2003/0212795 | A1 | * | 11/2003 | Harris et al. ................... 709/227 |
| 2008/0056276 | A1 | | 3/2008 | Gobara et al. |
| 2009/0063615 | A1 | | 3/2009 | Gobara et al. |

FOREIGN PATENT DOCUMENTS

| JP | 2002-354048 | | 12/2002 |
| JP | 2004-158923 | | 6/2004 |
| JP | 2004-166031 | | 6/2004 |
| JP | 2006238107 | A | 9/2006 |
| WO | 2004-030292 | | 4/2004 |
| WO | 2006013811 | A1 | 2/2006 |

* cited by examiner

OTHER PUBLICATIONS

International Search Report Dated Dec. 6, 2005.

*Primary Examiner* — Ajay Bhatia
(74) *Attorney, Agent, or Firm* — Pearne & Gordon LLP

(57) ABSTRACT

An information processor (1) comprises: a history packet transmitter (11) for transmitting a history packet; a request packet transmitter (12) for transmitting a request packet requesting transmission of a return packet; a packet transmission controller (13) for controlling transmission of a request packet by using a binary search method; a return packet receiver (14) for receiving a return packet transmitted from a server (3); and a port keeping time detector (15) for detecting the port keeping time of a communication processor (2) based on reception of a return packet by the return packet receiver (14). The server (3) includes: a request packet receiver (31) for receiving a request packet; and a return packet transmitter (32) for transmitting a return packet to a port of the communication processor (2) where a history packet passed when the request packet receiver (31) received a request packet. This configuration provides an information processing system for detecting the port keeping time of the communication processor.

32 Claims, 19 Drawing Sheets

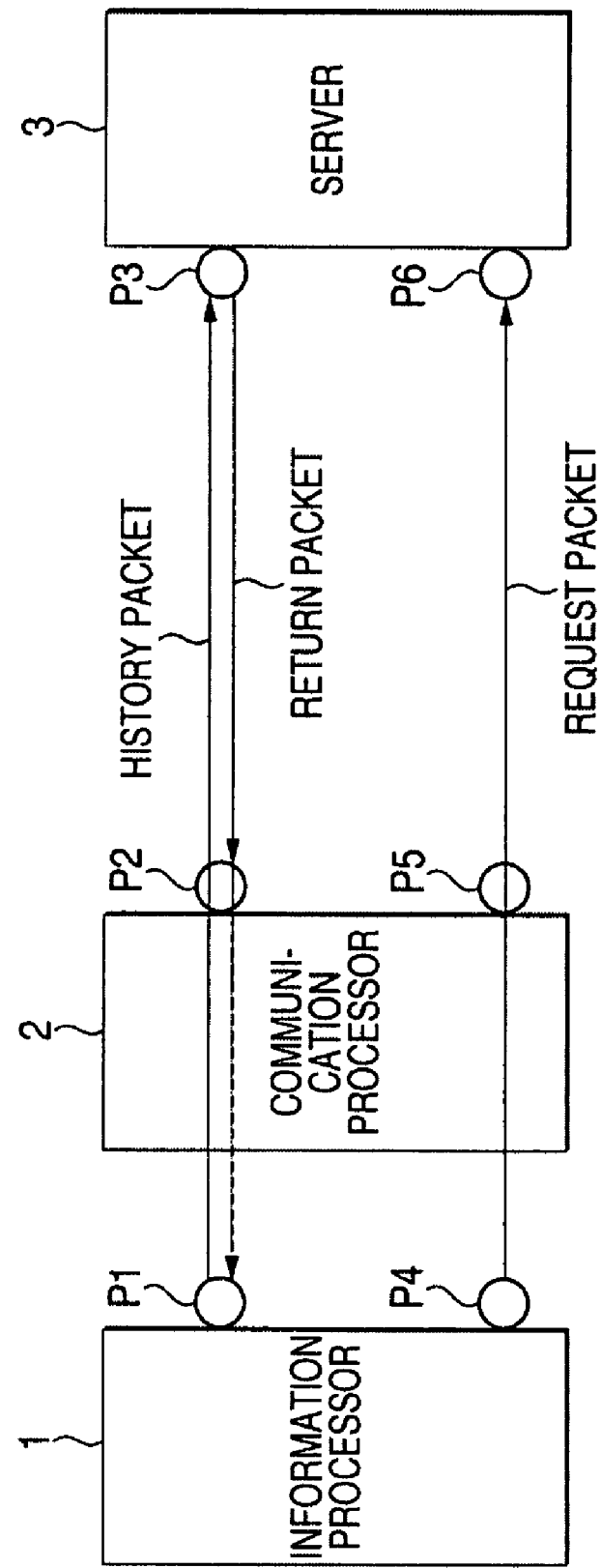

| DEVICE IDENTIFICA-TION INFORMATION | DESTINATION INFORMATION | |
|---|---|---|
| | IP ADDRESS | PORT NUMBER |
| AAA | 202.224.135.10 | 12345 |
| BBB | 202.224.135.55 | 23456 |
| ⋮ | ⋮ | ⋮ |

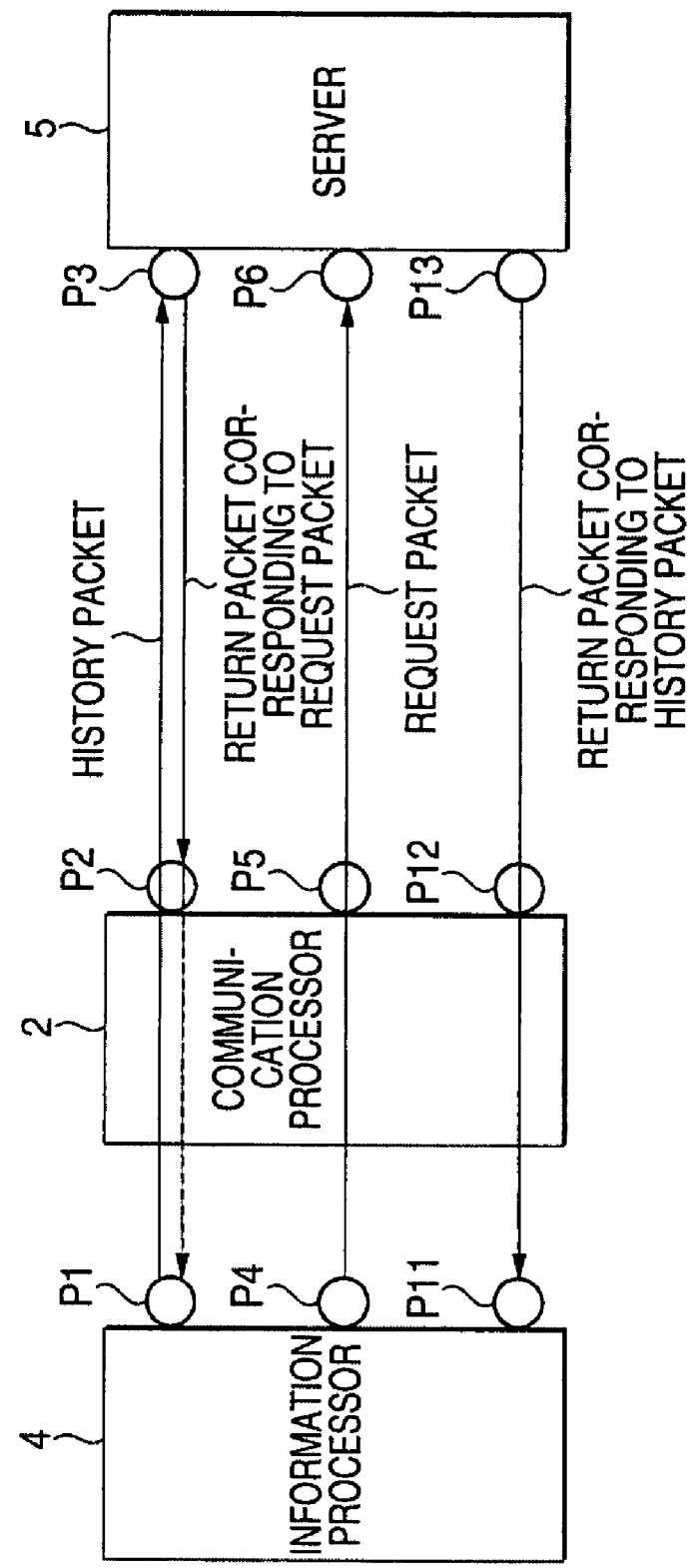

HISTORY PACKET

RETURN PACKET CORRESPONDING TO HISTORY PACKET

REQUEST PACKET

RETURN PACKET CORRESPONDING TO REQUEST PACKET

FIG. 23

| FLAG | WAIT TIME | NEXT WAIT TIME | |
|---|---|---|---|
| | | COMMUNICATION PACKET RECEIVED | RETURN PACKET RECEIVED |
| 0 | 15 SECONDS | - | 5 SECONDS |
| 0 | 30 SECONDS | 45 SECONDS | 15 SECONDS |
| 0 | 45 SECONDS | - | - |
| 0 | 1 MINUTE | 30 SECONDS | 1 MINUTE 30 SECONDS |
| 0 | 1 MINUTE 15 SECONDS | - | - |
| 0 | 1 MINUTE 30 SECONDS | 1 MINUTE 45 SECONDS | 1 MINUTE 15 SECONDS |
| 0 | 1 MINUTE 45 SECONDS | - | - |
| 1 | 2 MINUTES | 4 MINUTES | 1 MINUTES |
| 0 | 3 MINUTES | - | - |
| 0 | 4 MINUTES | - | - |

INFORMATION PROCESSING SYSTEM, INFORMATION PROCESSOR, SERVER, INFORMATION PROCESSING METHOD AND PROGRAM

TECHNICAL FIELD

The present invention relates to an information processing system or the like for detecting the port keeping time of a communication processor.

BACKGROUND ART

In an information processing system including an information processor, a communication processor and a server, for example a predetermined packet is periodically transmitted to a server from an information processor such as a PC (Personal Computer) for home use or a home appliance via a communication processor. Details of this technique are disclosed for example in the pamphlet (Page 1, FIG. 1 and the like) of the International Publication 2004/030292. The communication processor may be a router including the NAT (Network Address Translation) feature. The predetermined packet is periodically transmitted to maintain a port of a communication processor (to keep a packet from a WAN being transmitted to an information processor via a communication processor) in order to detect whether the IP address of the WAN (Wide Area Network) of the communication processor has changed or to make an access to the information processor from an external device such as a cell phone via a server.

In a communication processor including the NAT feature such as a router, the private IP address and the port number of a LAN (Local Area Network) are converted to the global IP address and the port number of a WAN when a packet is transmitted from the LAN to the WAN. In case a return packet is received from the WAN, reverse conversion is made and a resulting packet is passed to an information processor. The communication processor has time for such address conversion set therein. To be more precise, when a predetermined time has elapsed since an address conversion was last performed between a WAN and a LAN, the address conversion on a packet received from the WAN is no longer performed (address conversion is performed anew on a packet received from the LAN). That is, the packet from the WAN is not received by the information processor. This means that an external device such as a cell phone cannot access the information processor via a server. The predetermined period is hereinafter called the port keeping time.

In the above information processing system, the communication processor must be always ready to perform address conversion on a packet received from a server (from a WAN) in order for the information processor to receive information from the server. Thus, even in case it is unnecessary to exchange information between an information processor and a server, packets must be periodically transmitted from information processor to the server via a communication processor so as to enable the communication processor to perform address conversion on a packet transmitted from the server. A demand accompanies this practice that the transmission period of a packet to be periodically transmitted by the information processor should be as long as possible. This is to reduce transmission of unnecessary packets and the processing load on the information processor caused by transmission of packets. In particular, it suffices to shorten the transmission period of packets to be periodically transmitted by the information processor by a small amount (for example one or two seconds) with respect to the port keeping time of the communication processor to which the information processor is connected.

It is not known what type of communication processor the information processor will be connected to. In general, the period corresponding to the shortest port keeping time among those of the variety of communication processors available from manufacturers is set to the information processor and packets are transmitted using this period. In this case, even with the information processor connected to the communication processor having a long port keeping time, packets are transmitted in a preset short period, which results in transmission of numerous unnecessary packets.

DISCLOSURE OF THE INVENTION

The invention has been accomplished in view of the above problems. An object of the invention is to provide an information processing system capable of detecting the port keeping time of a communication processor to which an information processor is connected.

In order to attain the object, the invention provides an information processing system comprising: an information processor; a server; and a communication processor for performing processing on communications between the information processor and the server; the information processor including: a history packet transmitter for transmitting via one port of the communication processor a plurality of history packets as packets for leaving a transmission history in the communication processor; a request packet transmitter for transmitting to the server, via a port different from a history port as the port of a communication processor where the history packets have passed, one or more request packets as packets for requesting transmission of a return packet as a packet to be transmitted from the server; a return packet receiver for receiving a return packet transmitted from the server via the history port; a packet transmission controller for controlling transmission of a request packet by the request packet transmitter by using a binary search method based on reception of a return packet by the return packet receiver; and a port keeping time detector for detecting the port keeping time of the communication processor based on reception of a return packet by the return packet receiver; the server including: a request packet receiver for receiving the request packet; and a return packet transmitter for transmitting the return packet to the history port upon reception of a request packet by the request packet receiver.

With this configuration, it is possible to detect the port keeping time of a communication processor based on reception of a return packet by the return packet receiver transmitted in response to a request packet. It is thus possible to efficiently transmit a request packet by using the binary search method and thus efficiently detect a port keeping time. For example, by using the detected port keeping time, it is possible to periodically transmit a packet. As a result, for example, it is possible to avoid transmitting an unnecessary packet.

BRIEF DESCRIPTION OF THE DRAWINGS

FIG. 2 explains transmission/reception of packets according to Embodiment 1.

FIG. 17 explains transmission/reception of packets according to Embodiment 2.

FIG. 23 explains setting of a wait time.

DESCRIPTION OF THE REFERENCE NUMERALS AND SIGNS

Figure 1:
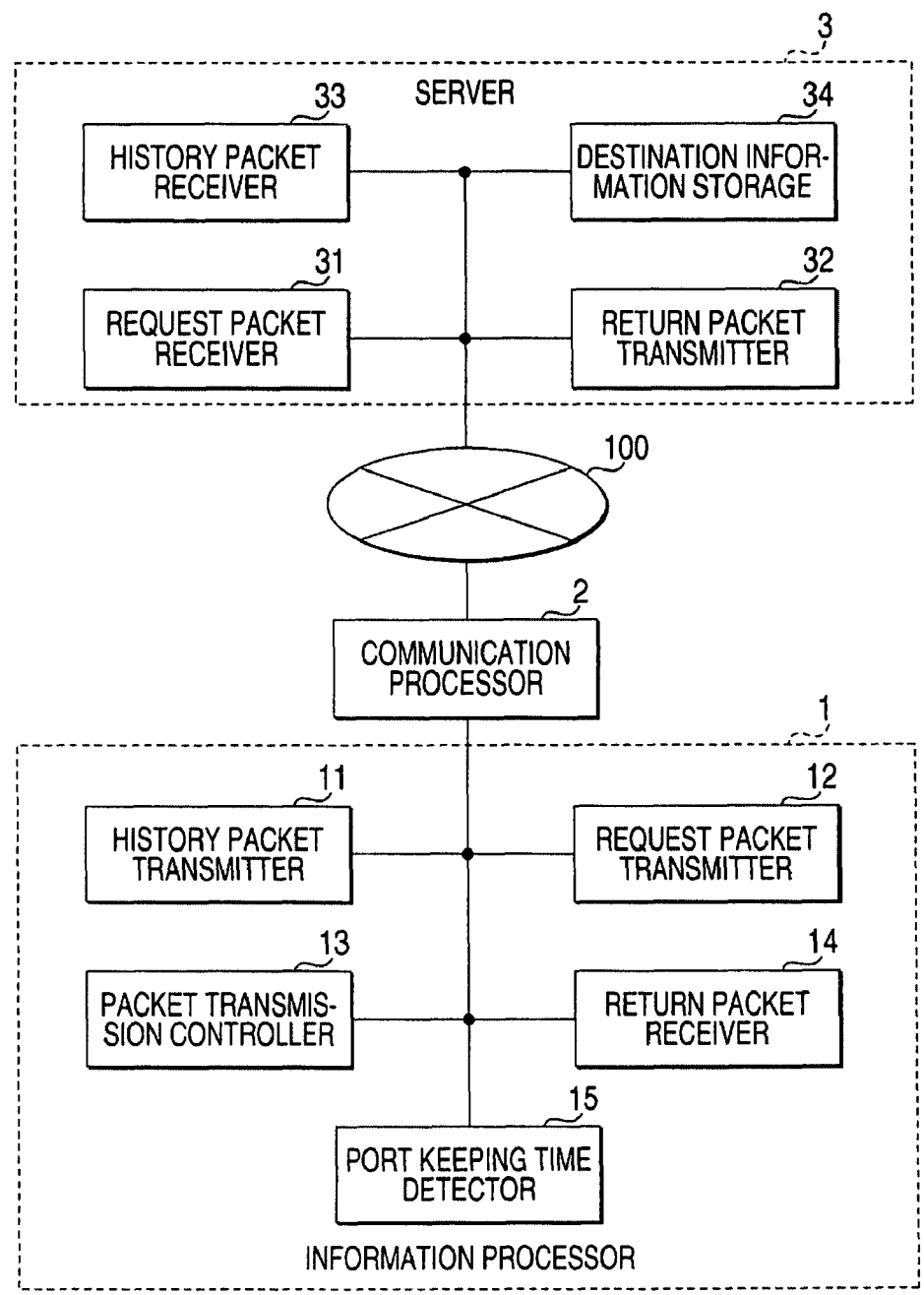
FIG. 1 is a block diagram showing the configuration of an information processing system according to Embodiment 1 of the invention.

1, 4: Information processor
2: Communication processor
3, 5: Server
11: History packet transmitter
12, 41: Request packet transmitter
13: Packet transmission controller
14, 42: Return packet receiver
15: Port keeping time detector
31: Request packet receiver
32: Return packet transmitter
33: History packet receiver
34: Destination information storage
51: Return packet transmitter

BEST MODE FOR CARRYING OUT THE INVENTION

Embodiments of the invention will be detailed below using embodiments of the invention. In the following embodiments, components having a same sign are identical or correspond to each other so that repetitive description may be omitted.

Embodiment 1

An information processing system according to Embodiment 1 of the invention will be described referring to drawings.

FIG. 1 is a block diagram showing the configuration of an information processing system according to this embodiment. In FIG. 1, the information processing system according to this embodiment comprises an information processor 1, a communication processor 2 and a server 3. While a single information processor 1 is connected to a communication processor 2 in FIG. 1, two or more information processors may be connected to the communication processor 2. The information processor 1 may be a computer, an electronic oven, a telephone set, a printer, a facsimile, a refrigerator, a washing machine, an air-conditioner, a television, a video recorder, or a set-top box. The communication processor 2 and the server 3 are interconnected via a wired or wireless communication circuit 100. The communication circuit 100 is for example the Internet, an intranet, or a public switched telephone network (PSTN).

The information processor 1 includes a history packet transmitter 11, a request packet transmitter 12, a packet transmission controller 13, a return packet receiver 14 and a port keeping time detector 15.

The history packet transmitter 11 transmits a plurality of history packets to the server 3. The history packets are transmitted via one port of the communication processor 2. The history packet refers to a packet used to leave a transmission history in the communication processor 2. The history packet is transmitted in order to determine the reference time of measuring the port keeping time of the communication processor 2 or to determine the destination of a return packet described later. The history packet is for example a UDP packet. The payload of the history packet includes or does not include some information. The port of the communication processor 2 to connect to the communication circuit 100 where a history packet passed is hereinafter referred to as a history port. The history packet transmitter 11 may include a transmitting device for packet transmission such as a modem or a network card. In case the history packet transmitter 11 does not include a transmitting device, a transmitting device (not shown) should be arranged between the history packet transmitter 11 and the communication processor 2. The history packet transmitter 11 may be implemented by hardware or software such as a driver for driving a transmitting device.

The request packet transmitter 12 transmits one or more request packets to the server 3. The request packet transmitter 12 transmits a request packet via a port of the communication processor 2 separate from the history port. The return packet is a packet transmitted from the server 3 to the history port of the communication processor 2. The request packet is a packet that requests transmission of a return packet. The request packet is for example a UDP packet. The payload of the request packet includes or does not include some information. The request packet may include a notice that the packet is a request packet instead of an instruction or a command to transmit a return packet so as to allow the server 3 to determine that it is a request packet. The request packet transmitter 12 may include a transmitting device for packet transmission such as a modem or a network card. In case the request packet transmitter 12 does not include a transmitting device, a transmitting device (not shown) should be arranged between the request packet transmitter 12 and the communication processor 2. The request packet transmitter 12 may be implemented by hardware or software such as a driver for driving a transmitting device.

The packet transmission controller 13 controls transmission of a request packet by the request packet transmitter 12. The packet transmission controller 13 controls transmission of a request packet based on reception of a return packet by the return packet receiver 14 mentioned later. "Based on reception of a return packet" means "based on whether a return packet is received by the return packet receiver 14. The packet transmission controller 13 controls transmission of a request packet by using the binary search method. The binary search method will be described later. Control of transmission of a request packet includes control of the transmit timing of a request packet by the request packet transmitter 12. Details of this processing will be described later.

The return packet receiver 14 receives a return packet transmitted from the server 3. The return packet is transmitted via the history port of the communication processor 2. As described later, the return packet receiver 14 does not receive all return packets transmitted from the server 3. This is because a return packet that has reached the communication processor 2 after the port keeping time of a history port that has elapsed among the return packets transmitted from the server 3 is not transmitted from the communication processor 2 to the information processor 1. The return packet receiver 14 may include a receiving device for reception such as a modem or a network card. In case the history packet transmitter 11 does not include a receiving device, a receiving device (not shown) should be arranged between the return packet receiver 14 and the communication processor 2. The return packet receiver 14 may be implemented by hardware or software such as a driver for driving a receiving device.

The port keeping time detector 15 detects the port keeping time of the communication processor 2 based on reception of a return packet by the return packet receiver 14. "Based on reception of a return packet" means "based on whether a return packet is received or by using the timing a return packet is received." Specific operation of the port keeping time detector 15 will be described later. The port keeping time detector 15 may detect a port keeping time based on transmission of a history packet as well as reception of a return packet. The port keeping time detector 15 may detect the port keeping time of the communication processor 2 or a port keeping time shorter than the port keeping time of the communication processor 2. For example, in case the port keeping time of the communication processor 2 is "2 minutes", the port keeping time detector 15 may detect the port keeping time of the communication processor 2 as "2 minutes" or "1 minute". Detection of a port keeping time by the port keeping time detector 15 will be described later. In the following description, the "port keeping time" may refer to information indicating the port keeping time detected by the port keeping time detector 15.

In case two or more components of the history packet transmitter 11, request packet transmitter 12 and return packet receiver 14 each has a device related to communications, the devices may be the same means or separate means.

The communication processor 2 performs processing related to communications between the information processor 1 and the server 3. The communication processor 2 according to this embodiment has the NAT feature and is called a router or the like. The communication processor 2 according to this embodiment converts the address information of a sending party included in a packet transmitted from the information processor 1 (that is address information of the information processor 1) to the address information of the communication processor 2 on the WAN side.

To be more specific, the communication processor 2 converts a source (sending party) address (Address A as a private IP address) and a source (sending party) port number (Port number B) included in a packet transmitted from the information processor 1 to the global IP address (Address X) and the port number (Port number Y) of the communication processor 2 on the WAN side. A packet transmitted from the server 3 to Address X and Port Number Y of the communication processor 2 on the WAN side has its destination Address X and Port Number Y converted to Address A and Port Number B of the information processor 1 before it is transmitted to the information processor 1. The global IP address is an address used by an information processor to communicate with an external device such as an external device connected to a WAN including the Internet. In general, the global IP address is an address used in a WAN environment. In case an electronic device communicates with a device connected to a LAN such as an intranet via a router having the NAT feature, the global IP address may be an address used on the LAN. The IP address may be a current so-called IPv4 address or an address of another version such as an IPv6 address.

In case a reception filter rule is set to the communication processor 2, packet reception takes place in accordance with the reception filter rule. Assuming that the address and port number of the destination of a packet as Address P and Port Number Q respectively, the reception filter rules include, in a case where a packet destined to Address P and Port Number Q as the destination address and port number is transmitted from the LAN side of the communication processor 2 to the WAN side, an Address Sensitive filter that receives only a packet from Address P, a Port Sensitive filter that receives only a packet from Port Number Q, and a No filter as an non-existent filter (that receives any packet from any address or any port number) are available. The process of the communication processor 2 receiving a packet means a process where the communication processor 2 accepts a packet from the WAN at a port of the communication processor 2 assigned to a packet transmitted from the information processor 1 on the LAN side, performs address conversion on the packet, and transmits the resulting packet to the information processor 1 on the LAN side.

As described in the above related art example, the period when the address conversion in the communication processor 2 takes place has a predetermined restriction. That is, address conversion between Address A and Port Number B and Address X and Port Number Y is no longer made at a point in time the port keeping time of the communication processor 2 has elapsed since address conversion was last performed between both parties. Even in case a packet is transmitted to Address X and Port Number Y via the communication circuit 100 after the port keeping time has elapsed, address conversion does not take place in the communication processor 2 and thus the information processor 1 does not receive the packet.

The server 3 includes a request packet receiver 31, a return packet transmitter 32, a history packet receiver 33 and a destination information storage 34.

The request packet receiver 31 receives a request packet transmitted from the information processor 1. The request packet receiver 31 may include a receiving device for packet reception such as a modem or a network card. In case the request packet receiver 31 does not include a receiving device, a receiving device (not shown) should be arranged between the request packet receiver 31 and the communication circuit 100. The request packet receiver 31 may be implemented by hardware or software such as a driver for driving a receiving device.

When the request packet receiver 31 receives a request packet, the return packet transmitter 32 transmits a return packet to a history port of the communication processor 2. The return packet transmitter 32 transmits a return packet based on the destination information stored by the destination information storage 34 described later. That is, the return packet transmitter 32 transmits a return packet to the address and port number indicated by the destination information. The return packet is for example a UDP packet. The payload of the request packet may include some information. The return packet transmitter 32 may include a transmitting device for packet transmission such as a modem or a network card. In case the return packet transmitter 32 does not include a transmitting device, a transmitting device (not shown) should be arranged between the return packet transmitter 32 and the communication circuit 100. The return packet transmitter 32 may be implemented by hardware or software such as a driver for driving a transmitting device.

The history packet receiver 33 receives a history packet transmitted from the information processor 1. The history packet receiver 33 may include a receiving device for packet reception such as a modem or a network card. In case the history packet receiver 33 does not include a receiving device, a receiving device (not shown) should be arranged between the history packet receiver 33 and the communication circuit 100. The history packet receiver 33 may be implemented by hardware or software such as a driver for driving a receiving device.

The destination information storage 34 stores the destination information onto a predetermined storage medium based on a history packet received by the history packet receiver 33. The destination information refers to information concerning the destination of a return packet. To be more precise, the destination information storage 34 reads a source address and a source port number included in the header of the history packet received by the history packet receiver 33 and stores destination information including the source address and the source port number. The source address of the history packet is the address of the communication processor 2 on the side of the communication circuit 100 and the source port number of the history packet is the port of the communication processor 2 on the side of the communication circuit 100, that is, the port number indicating the position of the history port. The predetermined storage medium onto which the destination information is stored may be a semiconductor memory, an optical disk or a magnetic disk that is included in the destination information storage 34 or provided outside the destination information storage 34.

In case two or more components of The request packet receiver 31, the return packet transmitter 32, and the history packet receiver 33 each has a device related to communications, the devices may be the same means or separate means.

The ports where a history packet, a request packet and a return packet pass will be described in detail. FIG. 2 explains the ports a history packet, a request packet and a return packet pass through. As shown in FIG. 2, a history packet transmitted from the information processor 1 is transmitted from Port P1. The history packet passes through Port P2 of the communication processor 2 on the side of the communication circuit 100 and is received at Port P3 of the server 3. Port P2 is the history port.

Port P2 of the communication processor 2 a history packet passes through is assigned anew by the communication processor 2 when the first history packet passes through Port P2. That is, it is important to transmit a history packet by using a port of the communication processor 2 not used by communications to another information processor or a server. For example, in case Port P2 is used for another purpose till then and other communications were made via Port P2 from transmission of a history packet to transmission of a return packet, it is impossible to detect a precise port keeping time. In order for Port P2 to be assigned anew by the communication processor 2 when the first history packet passes, a new port, that is, a port that has not been used in other communications may be used as Port P1 of the information processor 1.

After that, a request packet is transmitted from Port P4 of the information processor 1. The request packet is transmitted to Port P6 of the server 3 via Port P5 of the communication processor 2 on the side of the communication circuit 100. Port P2 must be different from Ports P5. This is because a precise port keeping time cannot be detected in case a request packet is transmitted via Port P2 from transmission of a history packet to transmission of a return packet. In order for Port P2 to be different from Port P5, Port P1 and Port P4 of the information processor 1 should be different from each other, for example. Or, depending on the type of the port assignment rule of the communication processor 2, Port P3 and Port P6 should be only different from each other even in case Port P1 and Port P4 are identical. In case Port P1 and Port P4 are different from each other, Port P2 is different from Port P5 even in case Port P3 and Port P6 are identical.

A return packet is transmitted from Port P3 that has received a history packet. In case a port keeping time has not yet elapsed, the return packet is received by Port P1 of the information processor 1 via Port P2 of the communication processor 2. In case a port keeping time has elapsed, a return packet is not transmitted from the communication processor 2 to the information processor 1. As understood from FIG. 2, in the information processing system according to this embodiment, a history packet and a return packet pass through the single Port P2 of the communication processor 2. In case a history packet is transmitted from Port 1 to Port 3 after the port keeping time related to Port P2 has elapsed, a new port may be assigned to the communication processor 2 such as Port P7 different from Port P2, or Port P2 may be used again. This depends on the specifications of the communication processor 2. In any case, processing is almost the same with Port P2 changed to Port P7 or the like. It is thus assumed that Port P2 is assigned for a history packet transmitted from Port P1 of the information processor 1 after the port keeping time has elapsed for ease of explanation.

While in the above case a return packet is transmitted from Port P3 that has received a history packet, a return packet need not be transmitted from Port P3 depending on the receiving filter rule of the communication processor 2.

While a history packet is transmitted to the server 3 in the above description, a history packet may be transmitted to another server instead of the server 3 depending on the type of the communication processor 2. In such a case, information concerning the position of a history port may be passed to the server 3 from a server that has received the history packet.

Next, detection of a port keeping time will be described. First, the "wait time" is defined. The wait time is a time from a point in time a return packet reached the communication processor 2 to a point in time a packet passed through a history port just before. As processing on the communication processor 2 assumed after a return packet has reached the communication processor 2, there may be a case where the return packet undergoes address conversion on the communication processor 2 and is transmitted to the information processor 1 and a case where the port keeping time of the communication processor 2 has elapsed and the return packet does not undergo address conversion on the communication processor 2. Roughly speaking, the wait time has two patterns. Pattern 1 corresponds to a case where a history packet passes through a history port at the beginning of a wait time. Pattern 2 corresponds to a case where a return packet passes through a history port at the beginning of a wait time. The beginning of a wait time refers to the point in time at the beginning of a wait time.

Figure 3A:
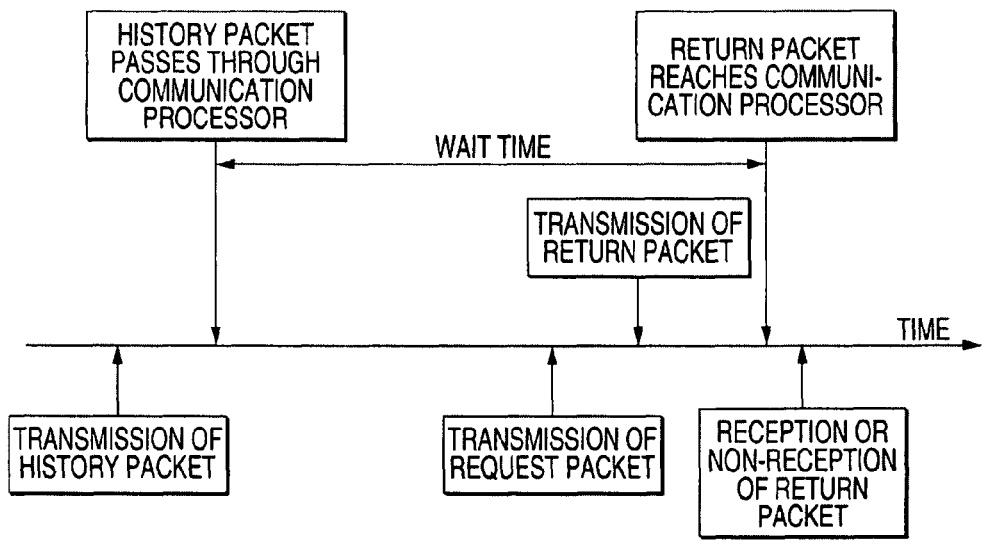
FIG. 3A explains a wait time according to Embodiment 1.

First, Pattern 1 will be described. FIG. 3A illustrates Pattern 1. When a history packet is transmitted from the information processor 1, the history packet passes through the history port of the communication processor 2. When a request packet is transmitted from the information processor 1 after a while, the request packet is received by the server 3, from which a return packet is transmitted from the server 3 to the history port of the communication processor 2. The return packet reaches the history port of the communication processor 2 and is transmitted to the information processor 1 in case the port keeping time has not yet elapsed. The return packet is not transmitted to the information processor 1 in case the port keeping time has elapsed. In this way, the period from when a history packet passes through the communication processor 2 to when a return packet reaches the communication processor 2 is called a wait time.

Figure 3B:
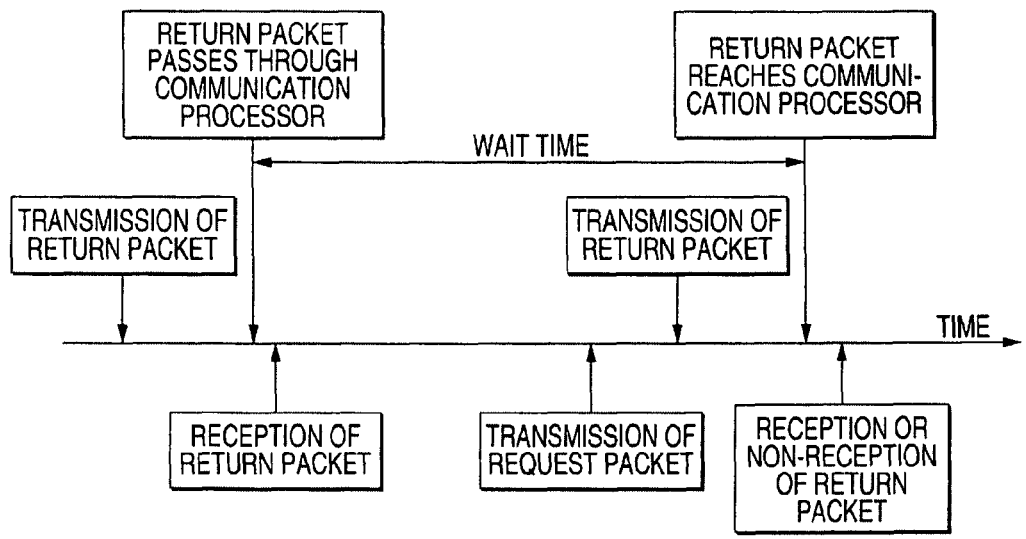
FIG. 3B explains a wait time according to Embodiment 1.

Next, Pattern 2 will be described. FIG. 3B illustrates Pattern 2. A return packet is transmitted from the server 3 in response to a request packet transmitted from the information processor 1. In case the port keeping time related to the history port has not yet elapsed, the return packet passes through the history port of the communication processor 2 and is received by the information processor 1. A request packet is transmitted from the information processor 1 after a while, and a return packet is transmitted from the server 3 in response to the request packet. This processing is the same as that in Pattern 1. In this case, the time from when the return packet passes through the communication processor 2 to when the next return packet reaches the communication processor 2 is a wait time. At the beginning of the wait time of Pattern 2, the return packet must reach the communication processor 2 as well as the return packet must be transmitted from the communication processors 2 to the information processor 1.

In case the information processor 1 has successfully received a return packet reaching the history port of the communication processor 2 at the end of a wait time, the port keeping time of the communication processor 2 is longer than the wait time. In case the information processor 1 has failed to receive a return packet reaching the history port of the communication processor 2 at the end of a wait time, the port keeping time of the communication processor 2 is shorter than the wait time. The end of a wait time refers to the end point in time of the wait time. In this way, by measuring a wait time and determining whether the information processor 1 has successfully received a return packet reaching the history port of the communication processor 2 at the end of a wait time, it is possible to measure the port keeping time of the communication processor 2. Thus, the port keeping time detector 15 detects a port keeping time based on a wait time during which the return packet receiver 14 has successfully received a return packet reaching the communication processor 2 at the end of a wait time among one or more wait times. For example, the port keeping time detector 15 may detect a port keeping time based on a wait time during which the return packet receiver 14 has successfully received a return packet reaching the communication processor 2 at the end of a wait time and whichever is the longest wait time of one or more wait times. The expression "detect a port keeping time based on a wait time during which the return packet receiver 14 has successfully received a return packet reaching the communication processor 2 at the end of a wait time" means that the wait time may be detected as a port keeping time or a time different from the wait time may be detected as a port keeping time. In the latter case, a wait time obtained by subtracting a predetermined time such as two or three seconds from the original wait time may be detected as a port keeping time. The port keeping time detector 15 may detect a port keeping time based on a wait time which is not the longest wait time of the wait times during which the return packet receiver 14 has successfully received a return packet reaching the communication processor 2 at the end of a wait time. For example, the port keeping time detector 15 may detect a port keeping time based on a wait time which is the second longest wait time of the wait times during which the return packet receiver 14 has successfully received a return packet reaching the communication processor 2 at the end of a wait time. As long as the port keeping time detector 15 detects a port keeping time based on any wait time among those wait times of 1 or more during which the return packet receiver 14 has successfully received a return packet reaching the communication processor 2 at the end of a wait time, any detection method may be used.

Next, the beginning of a wait time will be described. Packets that pass through a history port at the beginning of a wait time include a history packet and a return packet as shown in FIGS. 3A and 3B. There may be two patterns in measuring a wait time. In the first pattern, a history packet exclusively passes through a history port at the beginning of a wait time (Pattern A). In the second pattern, in case the information processor 1 has successfully received a return packet, the return packet is assumed as a packet passing through a history port at the beginning of a wait time, and in case the information processor 1 has failed to receive a return packet, a new history packet is transmitted and the history packet is assumed as a packet passing through a history port at the beginning of a wait time (Pattern. B). In the following description, the two patterns will be discussed. Note that any other pattern may be used and the invention is not limited to the two patterns.

[Pattern A]

Figure 4A:
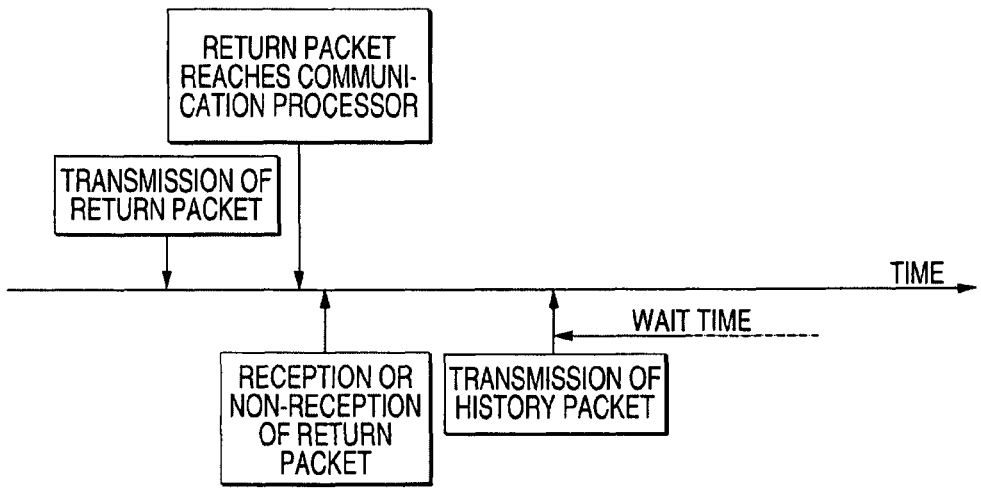
FIG. 4A explains the beginning of a wait time according to Embodiment 1.

FIG. 4A explains Pattern A. In Pattern A, as shown in FIG. 4A, the information processor 1 transmits a history packet at the beginning of a wait time irrespective of whether the information processor 1 has successfully received a return packet.

Thus, a packet that passes through a history port at the beginning of a wait time is a history packet A history packet is transmitted at the beginning of the first wait time as well. The packet transmission controller 13 controls transmission of a request packet as well as transmission of a history packet by the history packet transmitter 11 at the beginning of a wait time. In other words, the packet transmission controller 13 controls the history packet transmitter 11 so that a history packet will be transmitted at the beginning of a wait time.

In Pattern A, the port keeping time detector 15 detects the port keeping time of the communication processor 2 based on reception of a return packet by the return packet receiver 14 as well as transmission of a history packet by the history packet transmitter 11. Strictly speaking, as shown in FIG. 3A, the beginning of a wait time is a point in time a history packet passes through the communication processor 2 although it is difficult for the information processor 1 to know the point in time a history packet passes through the communication processor 2. Thus, as shown in FIG. 4A, in the port keeping time detector 15, a point in time a history packet passes through the communication processor 2 as the beginning of a wait time is a point in time the history packet is transmitted. While two or more request packets are transmitted in FIG. 4A, a single request packet may be transmitted by the information processor 1.

[Pattern B]

Figure 4B:
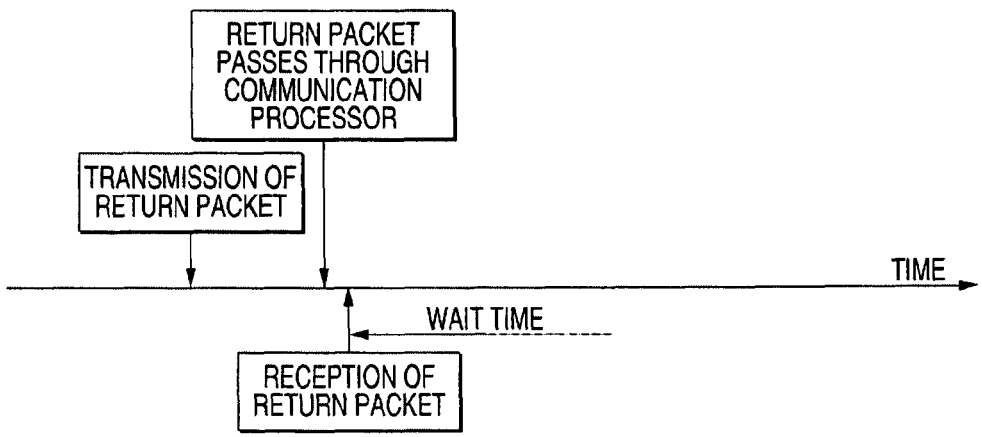
FIG. 4B explains the beginning of a wait time according to Embodiment 1.
Figure 4C:
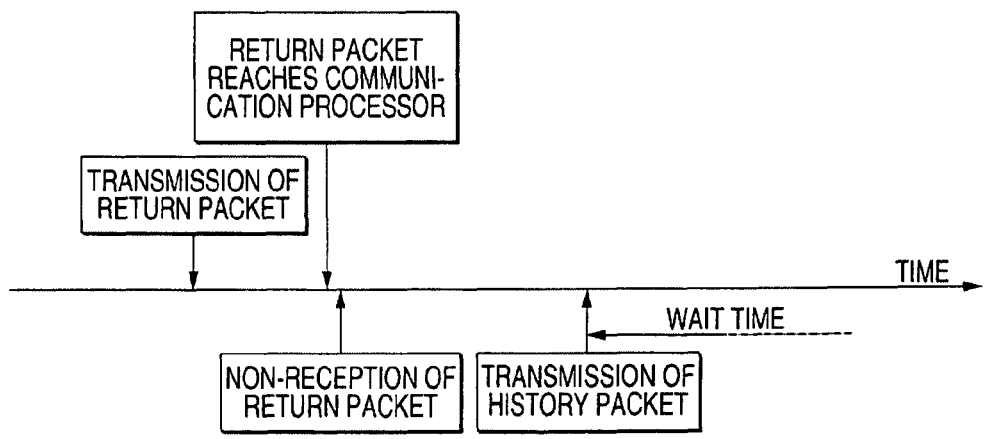
FIG. 4C explains the beginning of a wait time according to Embodiment 1.

FIGS. 4B and 4C explain Pattern B. In Pattern B, a packet that passes through a history port at the beginning of a wait time is a history packet or a return packet. In case the information processor 1 has successfully received a return packet, the information processor 1 does not transmit a history packet at the beginning of a wait time as shown in FIG. 4B and the return packet is a packet that passes through a history port at the beginning of a wait time. In case the information processor 1 has failed to receive a return packet, the information processor 1 transmits a history packet at the beginning of a wait time as shown in FIG. 4C and the history packet is a packet that passes through a history port at the beginning of a wait time. It is assumed that a history packet is transmitted at the beginning of a first wait time. The packet transmission controller 13 controls transmission of a request packet as well as controls the history packet transmitter 11 to engage the history packet transmitter 11 to transmit a history packet at the beginning of a next wait time in case the return packet receiver 14 has failed to receive a return packet corresponding to a request packet. "A return packet corresponding to a request packet" refers to a return packet transmitted in case a request packet is received.

In Pattern B, the port keeping time detector 15 detects the port keeping time of the communication processor 2 based on reception of a return packet by the return packet receiver 14 as well as transmission of a history packet by the history packet transmitter 11. Strictly speaking, as shown in FIGS. 3A and 3B, the beginning of a wait time is a point in time a history packet or a return packet passes through the communication processor 2 although it is difficult for the information processor 1 to know the point in time a history packet or a return packet passes through the communication processor 2. Thus, as shown in FIGS. 4B and 4C, in the port keeping time detector 15, in case a packet passing through a history port at the beginning of a wait time is a history packet, a point in time a packet passes through a history port as the beginning of a wait time is a point in time a history packet is transmitted, and in case a packet passing through a history port at the beginning of a wait time is a return packet, a point in time a packet passes through a history port as the beginning of a wait time is a point in time a return packet is received.

Figure 5A:
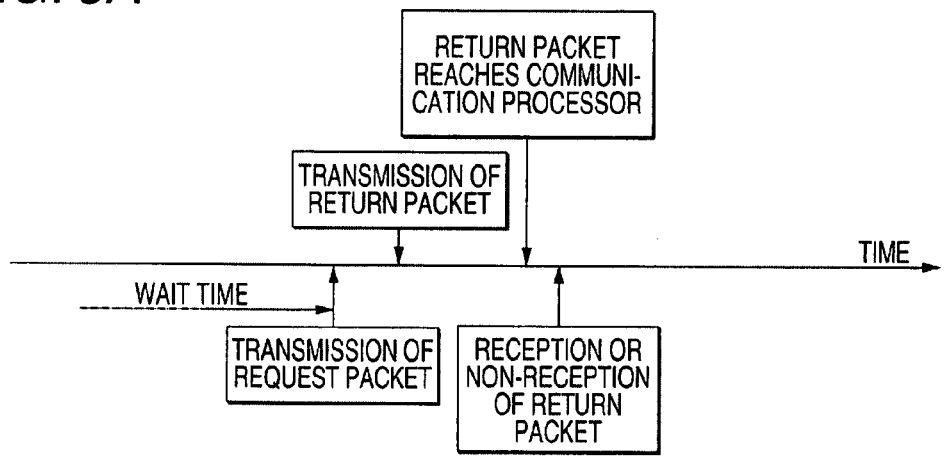
FIG. 5A explains the end of a wait time according to Embodiment 1.
Figure 5B:
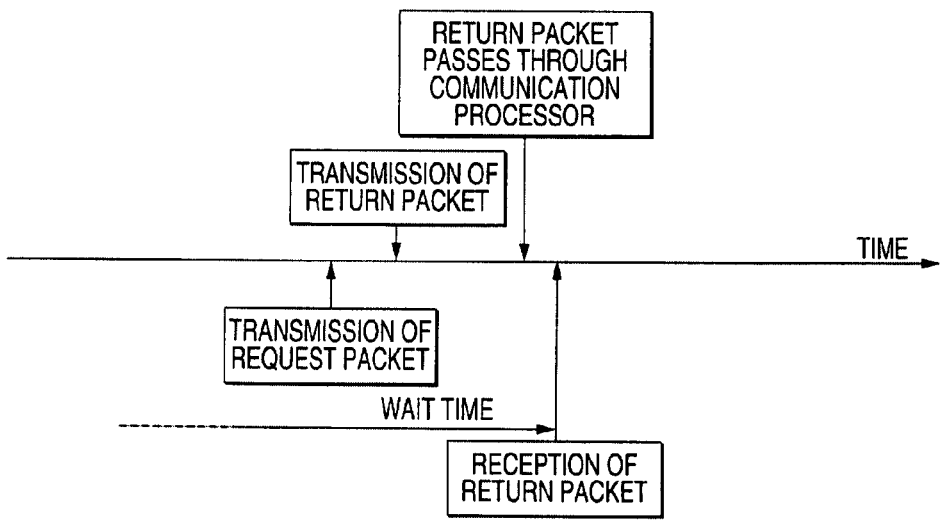
FIG. 5B explains the end of a wait time according to Embodiment 1.
Figure 5C:
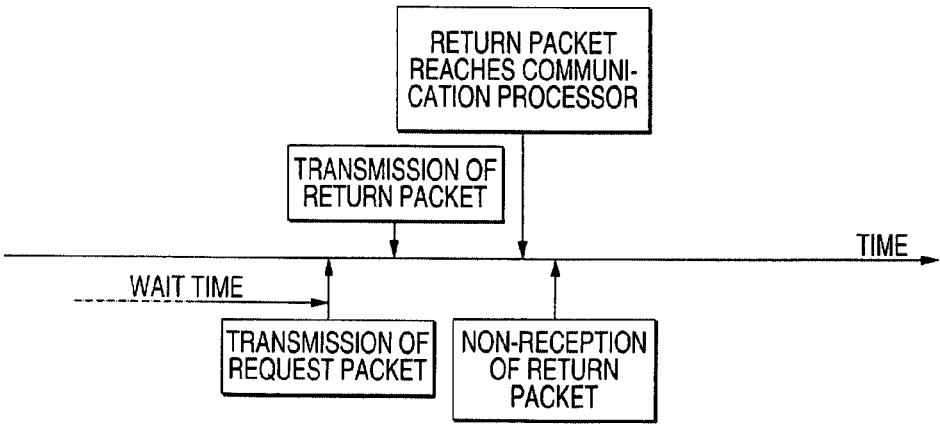
FIG. 5C explains the end of a wait time according to Embodiment 1.

Next, the end of a wait time will be described. The end of a wait time is a point in time a return packet reaches the communication processor 2, as shown in FIGS. 3A and 3B. It is however difficult for the information processor 1 to know the point in time a return packet reaches the communication processor 2. Thus, in measuring a wait time, the port keeping time detector 15 may assume that a point in time a return packet reaches the communication processor 2 as the end of a wait time is a point in time a request packet requesting transmission of the return packet is transmitted as shown in FIG. 5A (This pattern is called Pattern C). In measuring a wait time, the port keeping time detector 15 may assume that a point in time a return packet reaches the communication processor 2 as the end of a wait time is a point in time the return packet is received by the information processor 1 as shown in FIG. 5B (this pattern is called Pattern D). In measuring a wait time, in case the information processor 1 has successfully received a return packet, the port keeping time detector 15 may assume that a point in time a return packet reaches the communication processor 2 as the end of a wait time is a point in time the return packet is received as shown in FIG. 5B, and in case the information processor 1 has failed to receive a return packet, the port keeping time detector 15 may assume that a point in time a return packet reaches the history port of the communication processor 2 as the end of a wait time is a point in time a request packet requesting transmission of the return packet is transmitted as shown in FIG. 5C (this pattern is called Pattern E). Note that any other pattern may be used and the invention is not limited to these three patterns. Port keeping time is detected based on a wait time during which a return packet transmitted at its end is received. Thus, the same port keeping time is detected in Pattern D and Pattern E.

Next, control of transmission of a request packet by the packet transmission controller 13 will be described. The packet transmission controller 13 uses the binary search method to determine a wait time based on whether a return packet has been successfully received by the return packet receiver 14 and controls the request packet transmitter 12 to engage the request packet transmitter 12 to transmit a request packet to implement the wait time. Setting a wait time using the binary search method that is based on whether a return packet has been successfully received refers to setting, as the wait time of the next packet to be transmitted, a middle wait time between a wait time corresponding to a return packet successfully received by the information processor 1 and a wait time corresponding to a return packet not received by the information processor 1. The packet transmission controller 13 controls the transmission timing of a request packet so as to implement the wait time. The wait time corresponding to a return packet successfully received by the information processor 1 refers to a wait time a return packet transmitted at the end of which was successfully received by the information processor 1. The wait time corresponding to a return packet not received by the information processor 1 refers to a wait time a return packet transmitted at the end of which was not received by the information processor 1.

In this way, by setting a wait time using the binary search method, it is possible to search for the longest wait time (port keeping time) at high speed among the wait times corresponding to return packets that may be received by the information processor 1. For setting of a wait time using the binary search method, in case a return packet corresponding to a first wait time was not received and a return packet corresponding to a second wait time (a time shorter than the first wait time) was not received, a middle wait time (a third wait time) between the first wait time and the second wait time is set as a wait time of the next request packet to be transmitted. In case the return packet corresponding to the third wait time has been successfully received, the middle wait time between the third wait time and the first wait time is set as the wait time of the next request packet to be transmitted. In case the return packet corresponding to the third wait time has not been received, the middle wait time between the third wait time and the second wait time is set as the wait time of the next request packet to be transmitted. The above processing is repeated thereafter. Details of the setting will be described later.

While the beginning of a wait time used by the packet transmission controller 13 is the same as the beginning of a wait time used by the port keeping time detector 15, the end of a wait time used by the packet transmission controller 13 may be a point in time a request packet requesting transmission of a return packet is transmitted. That it, in the packet transmission controller 13, a point in time a return packet reaches the communication processor 2 as the end of a wait time may be a point in time a request packet requesting transmission of the return packet is transmitted. This is because it is not known whether the information processor 1 will receive a return packet transmitted in response to a request packet in a stage where the packet transmission controller 13 controls transmission of the request packet, and it is impossible to know the point in time the return packet is received. As described above, the wait time used by the packet transmission controller 13 may be different from the wait time used by the port keeping time detector 15.

Next, the timing the port keeping time detector 15 detects a port keeping time will be described. The port keeping time detector 15 may detect a port keeping time in case the difference between a wait time corresponding to a request packet transmitted by the request packet transmitter 12 and a wait time corresponding to a request packet transmitted immediately before the request packet is smaller than a predetermined value (such as 10 seconds or 5 seconds). The port keeping time detector 15 may detect a port keeping time in case a return packet receiver 14 has received a return packet corresponding to a request packet first transmitted by the request packet transmitter 12. The port keeping time detector 15 may detect a port keeping time in case a wait time is transmitted a predetermined number of times (for example four times). The port keeping time detector 15 may detect a port keeping time when a predetermined time (for example 10 minutes) has elapsed since the processing related to detection of a port keeping time started. The point in time the processing related to detection of a port keeping time started may be when the first history packet was transmitted.

Next, operation of the information processor 1 according to this embodiment will be described using a flowchart. In this embodiment, the flowchart used depends on the pattern of the beginning of a wait time. Thus, respective flowcharts for Patterns A and B will be described.

Figure 6:
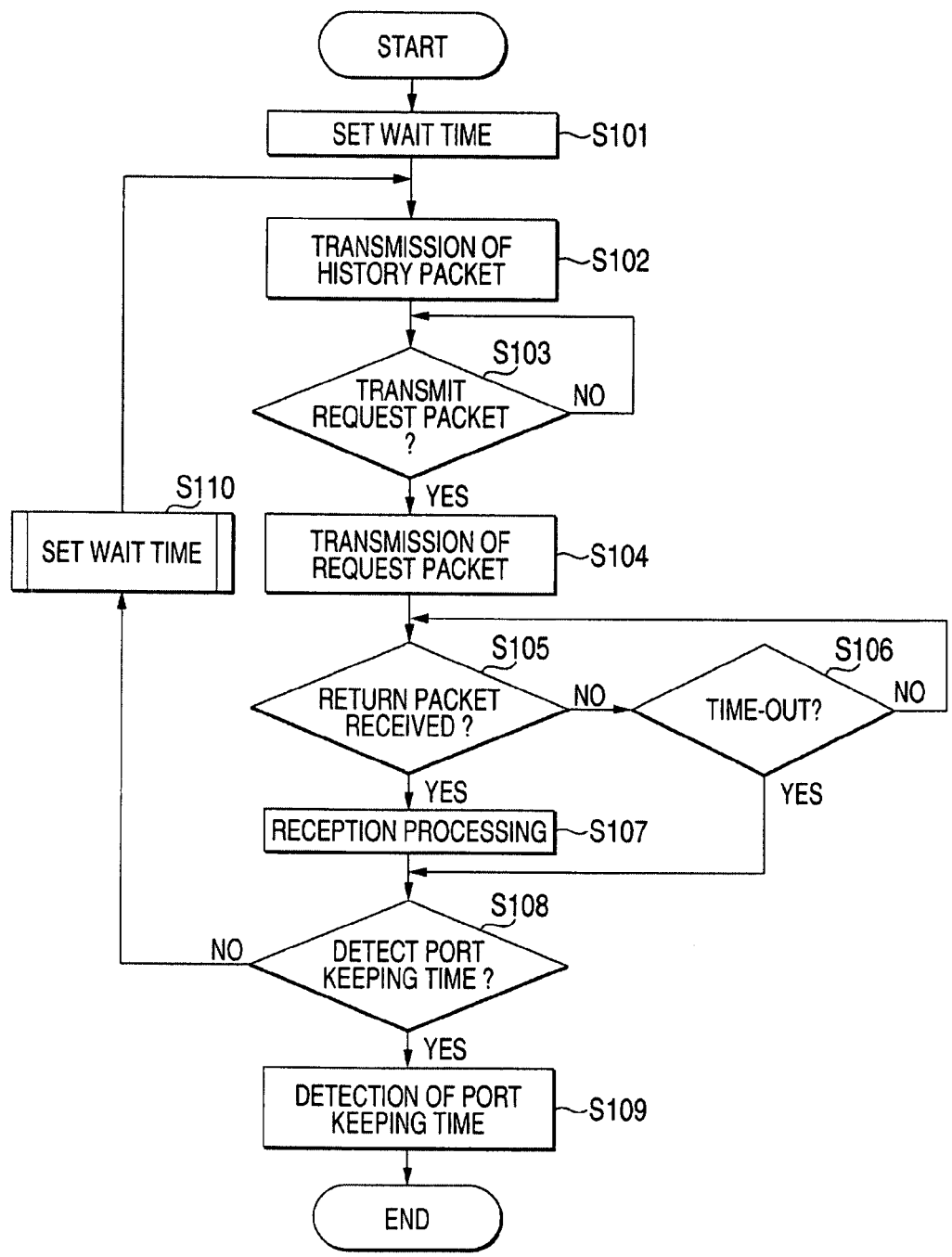
FIG. 6 is a flowchart showing the operation of an information processor according to Embodiment 1.

FIG. 6 is a flowchart showing the operation of the information processor 1 according to this embodiment in Pattern A.

(Step S101) The packet transmission controller 13 sets a wait time as a time from when a history packet is transmitted to when a request packet is received. Setting of a wait time may be recording of a wait time into a predetermined memory or the like. In setting of the first wait time, a set time may be previously determined.

(Step S102) The packet transmission controller 13 controls the history packet transmitter 11 to engage the history packet transmitter 11 to transmit a history packet to the server 3. As a result, the history packet is transmitted from the history packet transmitter 11 to the server 3 via the communication processor 2.

(Step S103) The packet transmission controller 13 determines whether timing is met for transmitting a request packet. In case timing is met for transmitting a request packet, execution proceeds to step S104. Otherwise, processing in step S103 is repeated until timing is met for transmitting a request packet. Whether timing is met for transmitting a request packet is determined based on whether a wait time set in step S101 or step S110 since a history packet was transmitted has elapsed.

(Step S104) The packet transmission controller 13 controls the request packet transmitter 12 to engage the request packet transmitter 12 to transmit a request packet to the server 3. As a result, a request packet is transmitted from the request packet transmitter 12 to the server 3.

(Step S105) The return packet receiver 14 determines whether it has received a return packet transmitted from the server 3 in response to the request packet transmitted in step S104. In case the return packet receiver 14 has received a return packet, execution proceeds to step S107. Otherwise, execution proceeds to step S106.

(Step S106) The return packet receiver 14 determines whether a time-out has occurred. The time-out refers to elapse of a predetermined period such as 10 seconds since the request packet transmitter 12 transmitted a request packet. In case a time-out has occurred, execution proceeds to step S108. Otherwise, execution returns to step S105.

(Step S107) The port keeping time detector 15 performs predetermined reception processing based on a received return packet. The predetermined reception processing may be storing as a wait time into a predetermined memory the period from a point in time a history packet was transmitted to a point in time a return packet was received.

(Step S108) The packet transmission controller 13 determines whether to detect a port keeping time. An example of a case under what conditions it is determined to detect a port keeping time has been described above. In case a port keeping time is to be detected, execution proceeds to step S109. Otherwise, execution proceeds to step S110.

(Step S109) The port keeping time detector 15 detects a port keeping time based on a wait time during which a return packet has been successfully received. This is the end of a series of processing to detect the port keeping time of the communication processor 2.

(Step S110) The packet transmission controller 13 sets a wait time using the binary search method based on whether a return packet has been received. Execution returns to step S102.

While a history packet in the first transmission and a history packet in the second transmission or later are transmitted under the control of the packet transmission controller 13 in the description of the flowchart of FIG. 6, a history packet in the first transmission may be transmitted based on the determination made by the history packet transmitter 11 rather than under the control of the packet transmission controller 13.

Figure 7:
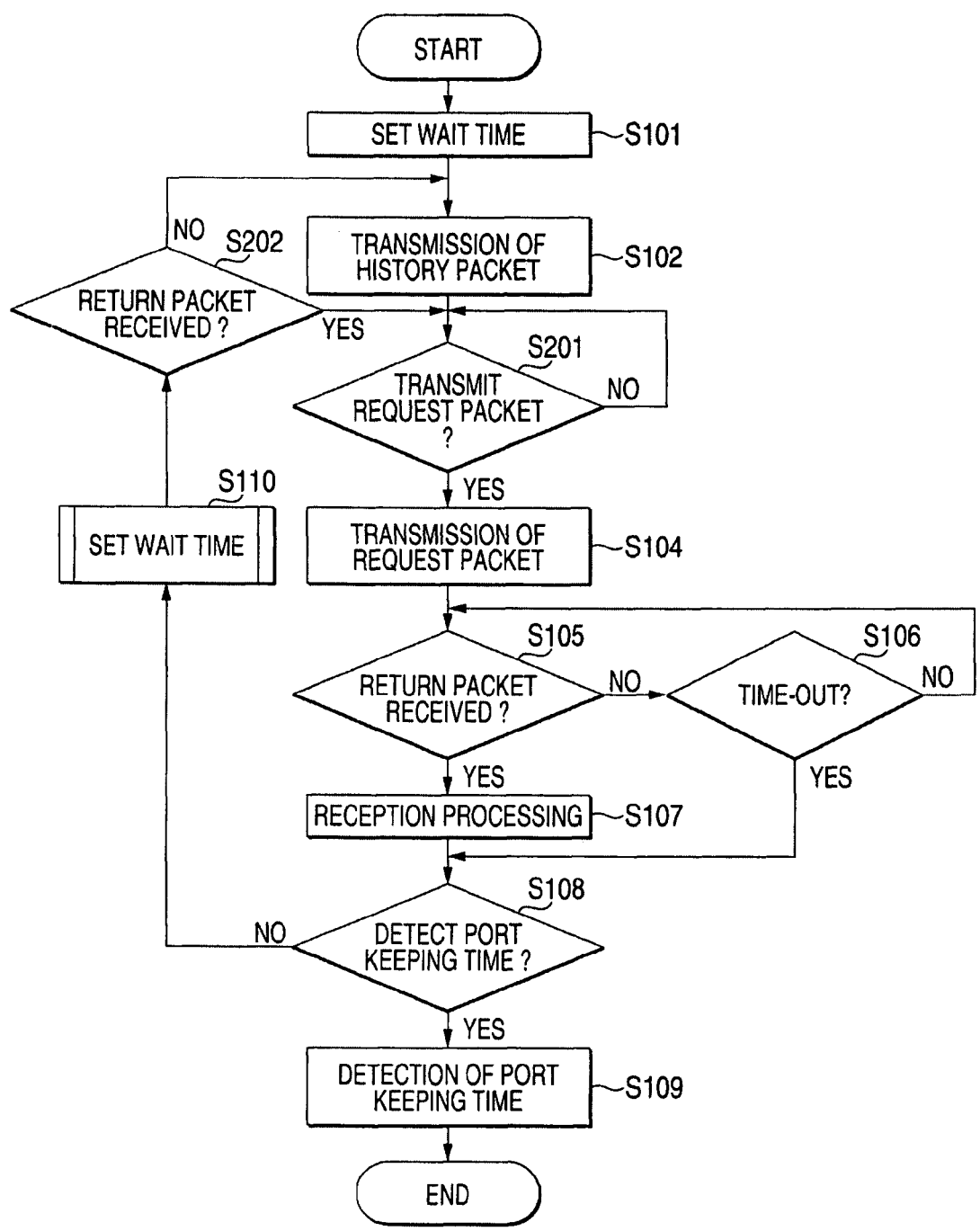
FIG. 7 is a flowchart showing the operation of the information processor according to Embodiment 1.

FIG. 7 is a flowchart showing the operation of the information processor 1 according to this embodiment in Pattern B. Processing other than steps S201 and S202 is the same as that in the flowchart of FIG. 6 so that the corresponding description is omitted. The predetermined reception processing in step S107 may be storing as a wait time into a predetermined memory the period from a point in time a return packet was received to a point in time a next return packet was received in case the beginning of a wait time is reception of a return packet.

(Step S201) The packet transmission controller 13 determines whether timing is met for transmitting a request packet. In case timing is met for transmitting a request packet, execution proceeds to step S104. Otherwise, processing in step S201 is repeated until timing is met for transmitting a request packet. Whether timing is met for transmitting a request packet is determined based on whether a wait time set in step S101 or step S110 has elapsed since a history packet was transmitted in step S102 in case execution has proceeded from step S102 to step S201, or based on whether a wait time set in step S110 has elapsed since a return packet was received in step S105 in case execution has proceeded from step S202 to step S201.

(Step S202) The packet transmission controller 13 determines whether a return packet was received in step S105 or a time-out occurred in step S106. In case a return packet was received, execution proceeds to step S201. In case a time-out occurred, execution proceeds to step S102.

In case it is determined that a time-out has occurred in step S106 in the flowcharts of FIGS. 6 and 7, for example, the port keeping time detector 15 may perform some processing upon time-out.

Operation of the server 3 according to this embodiment will be described using the flowchart of FIG. 8.

(Step S301) The history packet receiver 33 determines whether it has received a history packet transmitted from the information processor 1. In case the history packet receiver 33 has received a history packet, execution proceeds to step S302. Otherwise, execution proceeds to step S303.

(Step S302) The destination information storage 34 reads a source address and a source port number from the header of the history packet received by the history packet receiver 33 and stores the destination information including the source address and the source port number onto a predetermined medium. Execution then returns to step S301.

(Step S303) The request packet receiver 31 determines whether it has received a request packet. In case the request packet receiver 31 has received a request packet, execution proceeds to step S304. Otherwise, execution returns to step S301.

(Step S304) The return packet transmitter 32 reads the destination information stored by the destination information storage 34.

(Step S305) The return packet transmitter 32 transmits a request packet based on the destination information read in step S304. The destination of this return packet is an address and a port number indicated by the readout destination information. Execution then returns to step S301.

Figure 8:
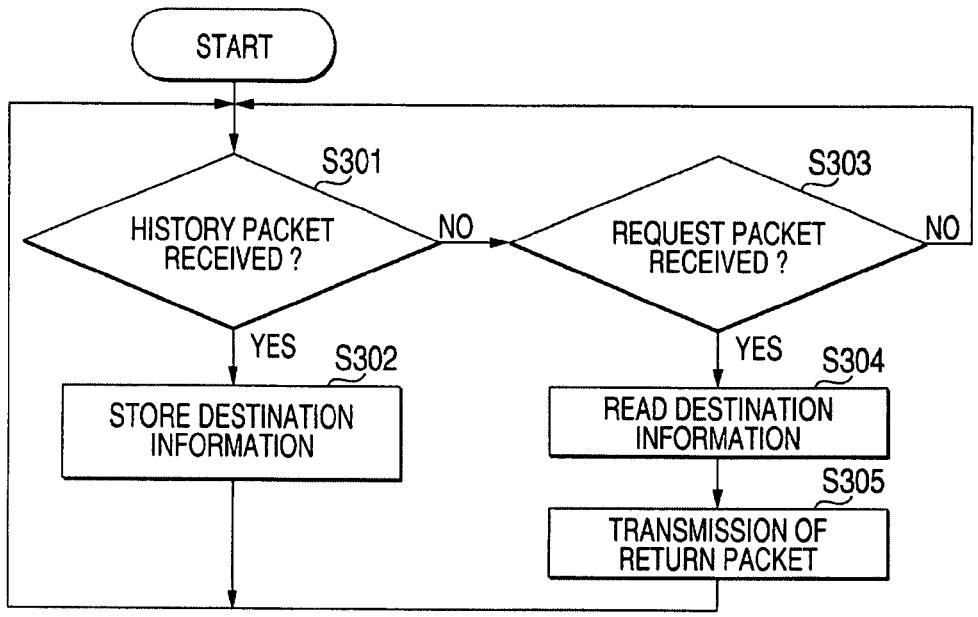
FIG. 8 is a flowchart showing the operation of a server according to Embodiment 1.

In the flowchart of FIG. 8, processing is terminated by power off or a processing termination interrupt.

Operation of the information processing system according to this embodiment will be described using specific examples. The examples include: a case where the beginning of a wait time is Pattern A and the end of a wait time is Pattern C (Example 1); a case where the beginning of a wait time is Pattern A and the end of a wait time is Pattern D (Example 2); and a case where the beginning of a wait time is Pattern B and the end of a wait time is Pattern E (Example 3). The examples will be described below.

In the following examples, it is assumed that a port keeping time detector 15 detects a port keeping time after a request packet is transmitted four times. In Example 1 and Example 2, it is assumed that the port keeping time detector 15 detects a port keeping time in case the return packet receiver 14 has received a return packet corresponding to a request packet transmitted in the first transmission. In Example 3, it is assumed that, in case the return packet receiver 14 has received for the first time a return packet corresponding to a transmitted, the packet transmission controller 13 determines the timing for transmitting a return packet so that a wait time will be longer than a wait time corresponding to the received return packet and controls the request packet transmitter 12 to engage the request packet transmitter 12 to transmit a return packet with the determined timing.

In case a return packet is not received after 10 seconds have elapsed from a time point a request packet was transmitted, it is assumed that a time-out has occurred. The IP addresses of the information processor 1, communication processor 2 and server 3 are as follows. The IP address of the communication processor 2 is an address on the side of the communication circuit 100.

Information processor 1: 192.168.0.1
Communication processor 2: 202.224.135.10
Server 3: 155.32.10.10

Figure 9A:
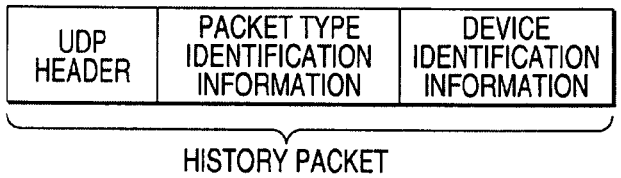
FIG. 9A shows an example of packet structure according to Embodiment 1.
Figure 9B:
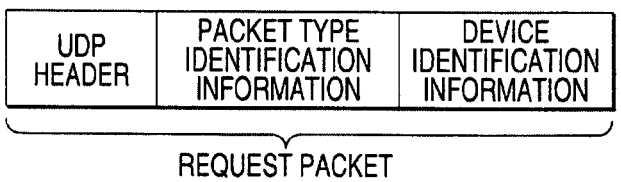
FIG. 9B shows an example of packet structure according to Embodiment 1.
Figure 9C:
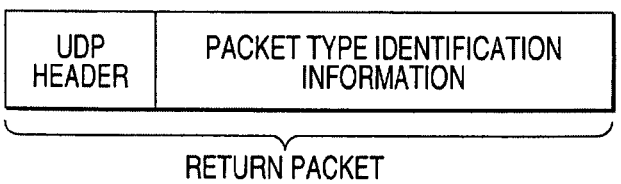
FIG. 9C shows an example of packet structure according to Embodiment 1.

FIGS. 9A to 9C show the structure of a history packet, a request packet and a return packet in the following examples. Each of the history packet, request packet and return packet has a UDP header and includes packet type identification information in its payload. The packet type identification information is information to identify the packet type. The information processor 1 and the server 3 identify a packet as a history packet, a request packet or a return packet based on the packet type identification information. The payload of a history packet or a request packet includes device identification information. The device identification information is information to identify an information processor transmitting these packets. Based on the device identification information included in a history packet, the destination information storage 34 of the server 3 stores destination information in association with the device identification information. Based on the device identification information included in a request packet, the return packet transmitter 32 of the server 3 reads the destination information corresponding to the device identification information included in the request packet as well as transmit a return packet to a history port where a history packet transmitted from an information processor that transmitted the request packet.

EXAMPLE 1

Figures 10, 11:
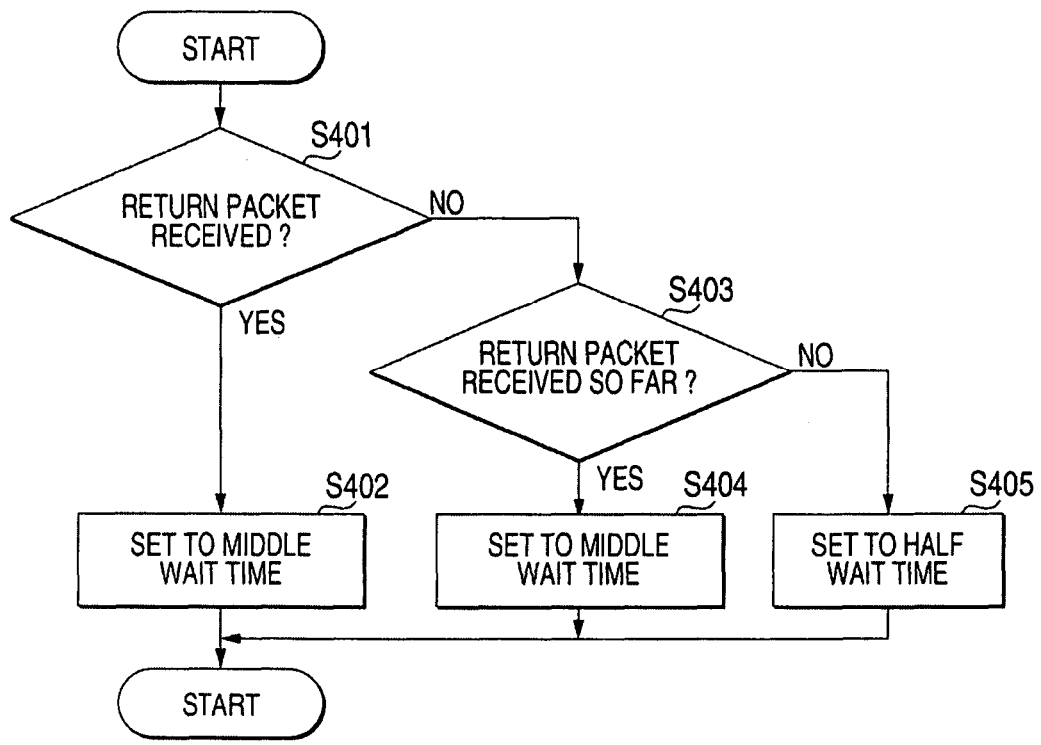
FIG. 10 is a flowchart showing the operation of an information processor according to Embodiment 1.
FIG. 11 shows an example of destination information according to Embodiment 1.

FIG. 10 is a flowchart showing the processing in step S110 of the flowchart of FIG. 6 according to this example.

(Step S401) The packet transmission controller 13 determines whether a return packet corresponding to a request packet transmitted just before has been successfully received by the return packet receiver 14. That is, the packet transmission controller 13 determines whether a return packet has been received in the preceding step S105 or a time-out has occurred in step S106. In case a return packet corresponding to a request packet transmitted has been successfully received by the return packet receiver 14, execution proceeds to step S402. In case a return packet corresponding to a request packet transmitted has not been received by the return packet receiver 14, execution proceeds to step S403.

(Step S402) The packet transmission controller 13 sets, as the wait time of a request packet to be transmitted next a wait time corresponding to the middle wait time between a wait time corresponding to a return packet successfully received just before and the shortest wait time of the wait times corresponding to return packets that have not been received by the return packet receiver 14. This is the end of the processing in step S110.

In this example, in case a return packet corresponding to a request packet transmitted in the first transmission is successfully received, a port keeping time is detected. Thus, in case it is determined that a return packet has been successfully received in the determination in step S110 (flowchart of FIG. 10), it is assumed that a return packet has not been received before. Thus, step S402 is followed without determining whether a return packet has not been received before (refer to the flowchart of FIG. 14 in Example 3).

(Step S403) The packet transmission controller 13 determines whether a return packet corresponding to a request packet has been successfully received by the return packet receiver 14 so far, that is, from when a first request packet was successfully received until the determination (the then determination in step S403). In case one or more return packets have been successfully received by the return packet receiver 14 so far, execution proceeds to step S404. Otherwise, execution proceeds to S405.

(Step S404) The packet transmission controller 13 sets, as the wait time of a request packet to be transmitted next, a middle wait time between a wait time corresponding to a return packet not received just before and the longest wait time of the wait times corresponding to return packets that have been received by the return packet receiver 14. This is the end of the processing in step S110.

(Step S405) The packet transmission controller 13 sets, as the wait time of a request packet to be transmitted next, a wait time half the wait time corresponding to a return packet that has not been received just before. This is the end of the processing in step S110.

The middle wait time between a wait time and another wait time may be the middle wait time between both wait times in a strict sense or a wait time in the neighborhood of the middle of both wait times. The latter case may be a wait time obtained by rounding the middle wait time between both wait times to the nearest integer in seconds.

Through setting of a wait time in the flowchart of FIG. 10, the packet transmission controller 13 performs the following control. The packet transmission controller 13 determines the timing to transmit a request packet so that, in case a return packet corresponding to a transmitted request packet has not been received by the return packet receiver 14, and a return packet corresponding to one or more request packets has been successfully received by the return packet receiver 14 so far, a wait time will be a middle wait time between a wait time, corresponding to the return packet, that has not been received and the longest wait time of a return packet corresponding to a request packet that has been successfully received by the return packet receiver 14 so far, and controls the request packet transmitter 12 to engage the request packet transmitter 12 to transmit a request packet with the timing determined. The packet transmission controller 13 determines the timing to transmit a request packet so that, in case a return packet corresponding to a transmitted request packet has been successfully received by the return packet receiver 14, and a return packet corresponding to a request packet has not been received by the return packet receiver 14 so far, a wait time will be a middle wait time between a wait time corresponding to the return packet that has been successfully received and the shortest wait time of a return packet, corresponding to a request packet, that has not been received by the return packet receiver 14 so far, and controls the request packet transmitter 12 to engage the request packet transmitter 12 to transmit a request packet with the timing determined. The packet transmission controller 13 determines the timing to transmit a request packet so that, in case a return packet corresponding to a transmitted request packet has not been received by the return packet receiver 14, and a return packet corresponding to a request packet has not been received by the return packet receiver 14 so far, a wait time will be a wait time half the wait time corresponding to the return packet that has not been received, and controls the request packet transmitter 12 to engage the request packet transmitter 12 to transmit a request packet with the timing determined.

In this example, it is assumed that the port keeping time of the communication processor 2 is 1 minute 20 seconds.

Determining that timing is met for detecting a port keeping time (for example the first activation of the information processor 1 or a reset caused by replacement of the communication processor 2), the packet transmission controller 13 of the information processor 1 sets a wait time to 2 minutes (step S101). After that, under the control of the packet transmission controller 13, the history packet transmitter 11 transmits a history packet having the structure shown in FIG. 9A to the IP address "155.32.10.10" of the server 3 (step S102). It is assumed that the payload of the history packet includes the device identification information "AAA". It is assumed that the history packet is transmitted to the server 3 via a port having the port number "12345" of the communication processor 2 (hereinafter referred to as "Port 12345", the same applies to other port numbers). The packet transmission controller 13 and the port keeping time detector 15 start time counting on respective timers from a point in time a history packet is transmitted.

The history packet receiver 33 of the server 3 receives the history packet and passes the history packet to the destination information storage 34 (step S301). The destination information storage 34 reads the device identification information "AAA" from the payload of the history packet and the source address "202.224.135.10" and the destination port number "12345" from the header of the history packet. The destination information storage 34 stores the destination information including the source address and the source port number in association with the device identification information "AAA" (Step S302). FIG. 11 shows the correspondence between device identification information and destination information stored by the destination information storage 34. The first record in FIG. 11 includes device identification information and destination information corresponding to information processor 1.

After that, the packet transmission controller 13 determines whether the preset wait time "2 minutes" has elapsed since time counting started, and at the point in time the timer has indicated 2 minutes, determines that timing is met for transmitting a request packet (step S103). The packet transmission controller 13 then controls the request packet transmitter 12 to engage the request packet transmitter 12 to transmit a request packet. As a result, a request packet having the structure shown in FIG. 9B is transmitted from the request packet transmitter 12 to the server 3 (step S104). The device identification information included in the request packet is "AAA". As mentioned earlier, the request packet is transmitted from a port different from the port of the information processor 1 from which a history packet was transmitted. It is assumed that the request packet was transmitted via the port 12355 of the communication processor 2. The packet transmission controller 13 and the port keeping time detector 15 stops time counting with the timing a request packet is transmitted and retains the then timer value "2 minutes" as a wait time.

The request packet is received by the request packet receiver 31 of the server 3 and passed to the return packet transmitter 32 (step S303). The return packet transmitter 32 reads the device identification information "AAA" included in the payload of the request packet and also reads the destination information stored in association with the device identification information, that is, the IP address "202.224.135.10" and the port number "12345" (step S304). The return packet transmitter 32 transmits a return packet having the structure shown in FIG. 9C to the readout IP address and port number (step S305).

The return packet reaches port 12345 of the communication processor 2 and the port keeping time "1 minute 20 seconds" related to the port has elapsed so that the return packet is not transmitted to the information processor 1. The return packet receiver 14 of the information processor 1 determines that a time-out has occurred at the point in time 10 seconds have elapsed since a request packet was transmitted (step S106) and passes a notice to the packet transmission controller 13 and the port keeping time detector 15 that a return packet has not been received. The packet transmission controller 13 and the port keeping time detector 15 retain the notice that a return packet related to the wait time "2 minutes" has not been received.

In this case, a request packet has not been transmitted four times and a return packet corresponding to a request packet transmitted in the first transmission has not been received. Thus, the packet transmission controller 13 determines that a port keeping time will not be detected (step S108). A return packet corresponding to the transmitted request packet was not received by the return packet receiver 14 (step S401) and a return packet has not been received by the return packet receiver 14 so far (step S403), so that the packet transmission controller 13 controls the request packet transmitter 12 to engage the request packet transmitter 12 to transmit a request packet having time information indicating the wait time "1 minute" that is half the wait time "2 minutes" corresponding to the return packet that has not been received. To be more precise, the packet transmission controller 13 set a wait time of 1 minute (steps S405, S110).

Same as the above description, a history packet including the device identification information "AAA" in its payload is transmitted to the server 3 under the control of the packet transmission controller 13 (step S102). The packet transmission controller 13 and the port keeping time detector 15 start time counting on respective timers from a point in time the history packet is transmitted. In this case, the destination information is overwritten to the destination information in the server 3 corresponding to the device identification information "AAA" already stored therein. It is assumed that the destination information stored by way of overwriting is the same as the first record in FIG. 11.

When the wait time "1 minute" has elapsed since a history packet was transmitted, a request packet is transmitted (step S103, S104). The packet transmission controller 13 and the port keeping time detector 15 stop time counting with the timing in which the request packet is transmitted and retains the then timer value "1 minute" as a wait time.

In response to the transmission of the request packet, a return packet is transmitted from the server 3 to the communication processors as described above (steps S303 to S305). In this case, the port keeping time "1 minute 20 seconds" of the communication processor 2 has not elapsed so that the return packet is received by the return packet receiver 14 (step S105). The packet transmission controller 13 and the port keeping time detector 15 retains a notice that a return packet related to the wait time "1 minute" has been successfully received (step S107).

In this case also, a request packet is not transmitted four times so that it is determined that a port keeping time will not be detected (step S108). In this case, a return packet corresponding to a wait time of one minute is received by the return packet receiver 14 (step S401) and a return packet corresponding to a wait time of two minutes has not been received. Thus a middle wait time "1 minute 30 seconds" between the wait time "1 minute" corresponding to the received return packet and the wait time "2 minutes" corresponding to a return packet that has not been received by the return packet receiver 14 is set as a wait time (steps S402, S110).

Same as the above processing, a history packet including the device identification information "AAA" in its payload is transmitted to the server 3 under the control of the packet transmission controller 13 (step S102). When the wait time "1 minute 30 seconds" has elapsed since a history packet was transmitted, a request packet is transmitted (step S103, S104). Same as the above description, a return packet is transmitted from the server 3 to the communication processor 2 in response to the transmission of the request packet (steps S303 to S305). In this case, the port keeping time "1 minute 20 seconds" of the communication processor 2 has elapsed so that the return packet receiver 14 of the information processor 1 determines that a time-out has occurred when 10 seconds have elapsed since a request packet was transmitted (step S106) and passes a notice to the packet transmission controller 13 and the port keeping time detector 15 that a return packet has not been received. The packet transmission controller 13 and the port keeping time detector 15 retain a notice that a return packet related to the wait time "1 minute 30 seconds" has not been received.

In this case also, a request packet is not transmitted four times so that it is determined that a port keeping time will not be detected (step S108). In this case, a return packet corresponding to a wait time of one minute 30 seconds is not received by the return packet receiver 14 (step S401) and one or more return packets have been received by the return packet receiver 14 so far (step S403). Thus, a middle wait time "1 minute 15 seconds" between the wait time "1 minute 30 seconds" corresponding to the return packet that has not been received and the longest wait time "one minute" of the wait times corresponding to return packets received by the return packet receiver 14 so far is set as a wait time (steps S404, S110). Same as the above processing, a history packet and a request packet are transmitted (steps S102 to S104).

The port keeping time of the communication processor 2 is "1 minute 20 seconds" so that a return packet transmitted from the server 3 in response to a request packet undergoes address conversion in the communication processor 2 and is then transmitted to the information processor 1. The return packet is successfully received by the return packet receiver 14 (step S105) and a notice is passed to the packet transmission controller 13 and the port keeping time detector 15 that a return packet has been successfully received. The packet transmission controller 13 and the port keeping time detector 15 retain the notice that a return packet related to the wait time "1 minute 15 seconds" has been successfully received (step S107).

A request packet having been transmitted four times, the packet transmission controller 13 determines that timing is met for detecting a port keeping time (step S108) and passes an indication to detect a port keeping time to the port keeping time detector 15. The port keeping time detector 15 sets as the port keeping time of the communication processor 2 the longer wait time "1 minute 15 seconds" of the wait times "1 minute" and "1 minute 15 seconds" during which a return packet has been successfully received, in response to the instruction (step S109).

After that, the detected port keeping time is used for example in the processing by a predetermined processor (not shown) of the information processor 1. The processing made by the processor may be storing the detected port keeping time onto a predetermined recording medium (not shown), using the detected port keeping time as a periodical packet transmission period to periodically transmit a packet to the server 3 or the like, transmitting the detected port keeping time to a device connected to the local network side of the communication processor 2 in case the device periodically transmits a packet, or any other processing. In this way, the detected port keeping time may be used by the information processor 1 or by another information processor connected to the local network side of the communication processor 2. A packet periodically transmitted using the port keeping time may be destined to the server 3 or another server. A period shorter than the detected port keeping time may be used as the transmission period of a packet to be periodically transmitted.

Figure 12:
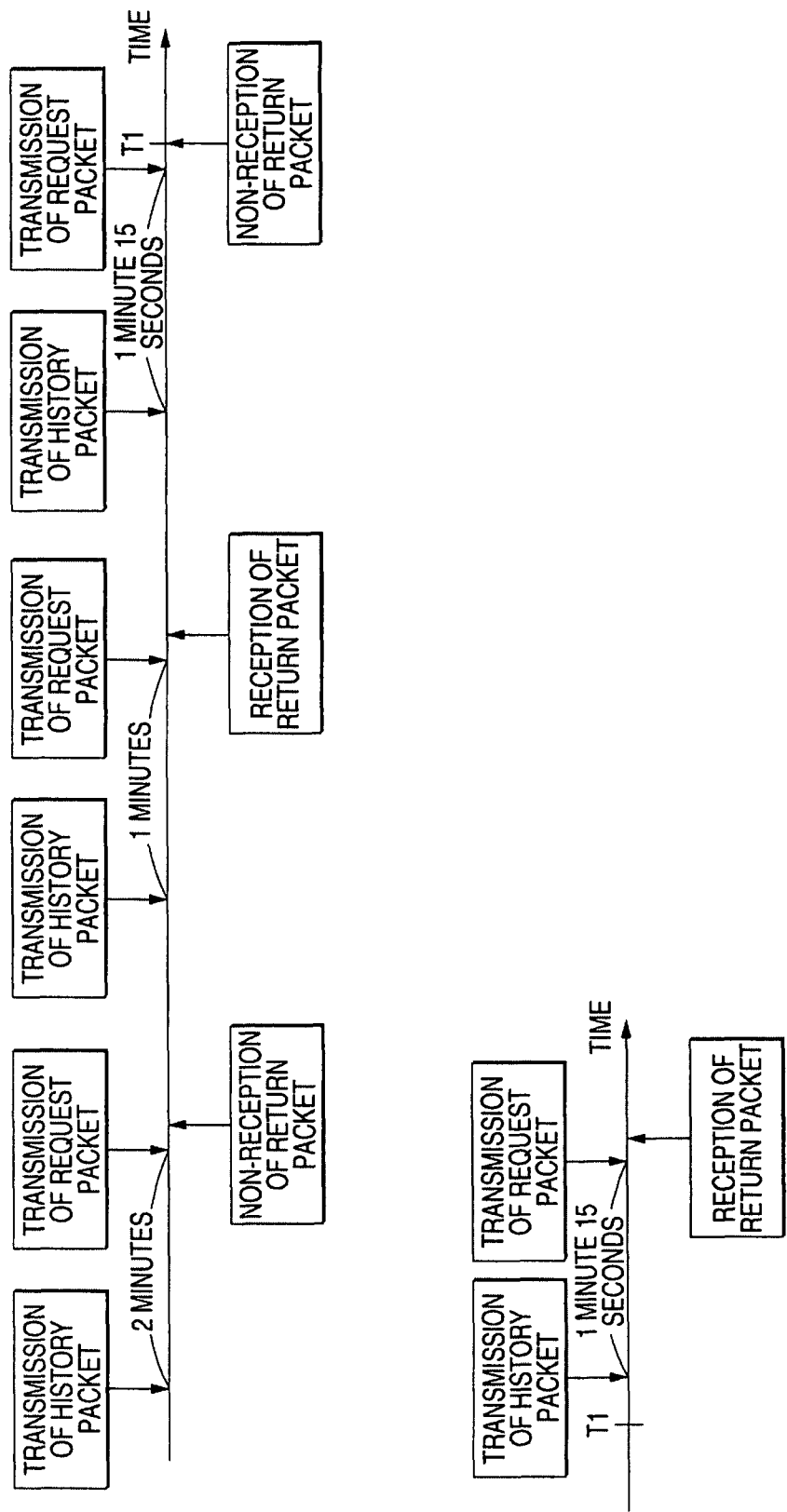
FIG. 12 explains transmission/reception of packets according to Embodiment 1.

FIG. 12 explains transmission of a history packet, transmission of a request packet, and reception (or non-reception) of a return packet in this example. While return packets corresponding to wait times of 1 minute and 1 minute 15 seconds were successfully received in this case, return packets corresponding to wait times of 2 minutes and 1 minute 30 seconds were not received, so that the port keeping time detected was 1 minute 15 seconds.

While destination information corresponding to device identification information is stored by way of overwriting in case a history packet is received by the server 3 in this example, storage of destination information by way of overwriting is not necessary in case the destination information is unchanged.

Figure 13:
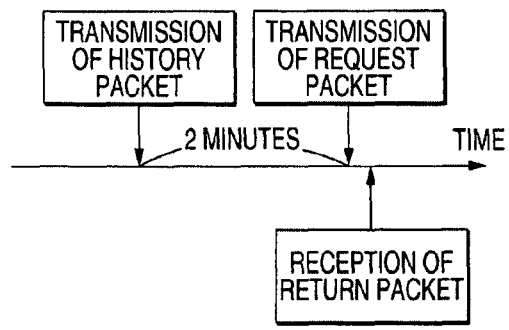
FIG. 13 explains transmission/reception of packets according to Embodiment 1.

While the port keeping time of the communication processor 2 is "1 minute 20 seconds" in this example, a return packet corresponding to a request packet transmitted in the first transmission is received by the information processor 1 in case the port keeping time of the communication processor 2 is "5 minutes". In such a case, it is determined that timing is met for detecting a port keeping time at the point in time a first return packet is received (step S108) and the port keeping time detected is 2 minutes (step S109). FIG. 13 explains transmission of a request packet and reception of a return packet in that case.

EXAMPLE 2

This example is the same as Example 1 except that the end of a wait time is Pattern D. Thus, detailed description is omitted except for description of the end of a wait time. In this example also, FIG. 12 explains transmission of a history packet, transmission of a request packet, and reception (or non-reception) of a return packet.

A wait time of two minutes is set (step S101) and a history packet is transmitted to the server 3 (step S102). The packet transmission controller 13 and the port keeping time detector 15 start time counting on respective timers from the point in time a history packet is transmitted. After that, when the timer values has indicated 2 minutes, it is determined that timing is met for transmitting a request packet by the packet transmission controller 13 (step S103) and a request packet is transmitted to the server 3 (step S104). In this case, the port keeping time "1 minute 20 seconds" of the communication processor 2 has elapsed so that a return packet transmitted from the server 3 does not undergo address conversion in the communication processor and is not transmitted to the information processor 1. It is determined that a time-out has occurred and the wait time "1 minute" is set (step S110). In this case, a return packet is not received so that the port keeping time detector 15 does not retain a wait time. The packet transmission controller 13 retains a wait time, same as Example 1.

Same as the above description, a history packet is transmitted and a request packet is transmitted when 1 minute has elapsed since transmission of the history packet (steps S102 to S104). In this case, the port keeping time "1 minute 20 seconds" of the communication processor 2 has not yet elapsed so that a return packet transmitted from the server 3 undergoes address conversion in the communication processor 2 and is then transmitted to the information processor 1.

The return packet receiver 14 of the information processor 1 receives the return packet (step S105) and passes a notice to the packet transmission controller 13 and the port keeping time detector 15 that a return packet has been successfully received. The packet transmission controller 13 retains the wait time "1 minute" as a wait time during which a return packet has been successfully received. The port keeping time detector 15 terminates time counting on a timer at the point in time and retains the then timer value "1 minute 1 second" as a wait time during which a return packet has been successfully received. While in this example the period from when a request packet is received to when a return packet is received is "1 second", the period varies to 0.5 seconds, 2 seconds, 3 seconds or the like depending on the state of the information processor 100 or processing speed of the server 3. In the following examples also, it is assumed that the period from when a request packet is received to when a return packet is received is "1 second".

The wait time "1 minute 30 seconds" is set by the packet transmission controller 13 (step S110 and transmission of a history packet and transmission of a request packet are repeated (steps S102 to S104). In this case, the wait time is longer than the port keeping time "1 minute 20 seconds" of the communication processor 2 so that a return packet transmitted from the server 3 does not undergo address conversion in the communication processor 2 and is not transmitted to the information processor 1. It is determined that a time-out has occurred by the return packet receiver 14 (step S106) and a new wait time "1 minute 15 seconds" is set (step S110). Then transmission of a history packet and transmission of a request packet are repeated (steps S102 to S104). In this case, the port keeping time "1 minute 20 seconds" of the communication processor 2 has not yet elapsed so that a return packet transmitted from the server 3 undergoes address conversion in the communication processor 2 and is then transmitted to the information processor 1.

The return packet receiver 14 of the information processor 1 receives the return packet (step S105) and passes a notice to the packet transmission controller 13 and the port keeping time detector 15 that a return packet has been successfully received. The packet transmission controller 13 retains the wait time "1 minute 15 seconds" as a wait time during which a return packet has been successfully received. The port keeping time detector 15 terminates time counting on a timer at the point in time and retains the then timer value "1 minute 16 seconds" as a wait time during which a return packet has been successfully received.

A request packet having been transmitted four times, the packet transmission controller 13 determines that timing is met for detecting a port keeping time (step S108) and passes an indication to detect a port keeping time to the port keeping time detector 15. The port keeping time detector 15 sets as the port keeping time of the communication processor 2 the longer wait time "1 minute 16 seconds" of the wait times "1 minute 1 second" and "1 minute 16 seconds" during which a return packet has been successfully received, in response to the instruction (step S109).

EXAMPLE 3

Figure 14:
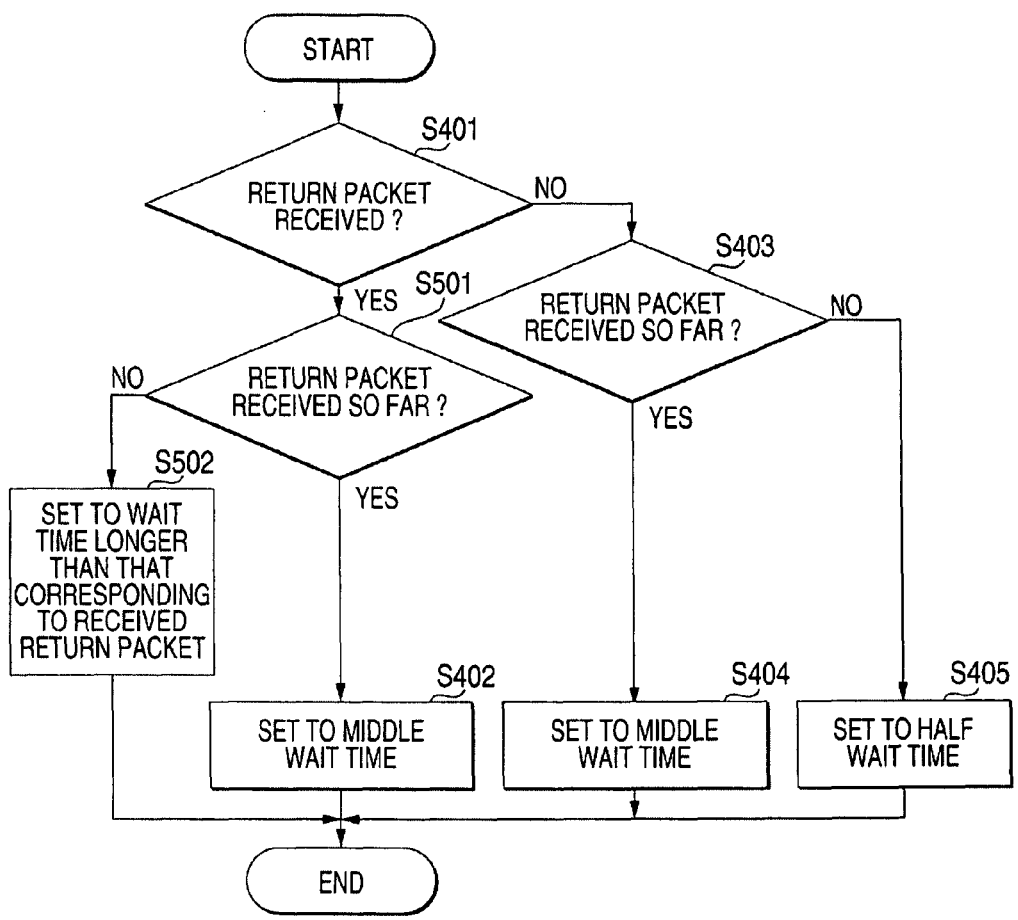
FIG. 14 is a flowchart showing the operation of an information processor according to Embodiment 1.

FIG. 14 is a flowchart showing the processing in step S110 of the flowchart of FIG. 7 according to this, example. Processing other than steps S501 and S502 is the same as that in the flowchart of FIG. 10 so that the corresponding description is omitted.

(Step S501) The packet transmission controller 13 determines whether the return packet receiver 14 has failed to receive a return packet corresponding to a request packet so far, that is, from when it received a first request packet to the determination. In case the return packet receiver 14 has failed to receive a return packet so far, execution proceeds to step S402. In case the return packet receiver 14 has not failed to receive a return packet so far, execution proceeds to step S502.

(Step S502) The packet transmission controller 13 sets, as the wait time of a next request packet to be transmitted, a wait time longer than the wait time corresponding to a return packet transmitted just before. This is the end of the processing in step S110.

A wait time longer than a certain wait time may be a wait time obtained by adding a predetermined time such as 2 minutes to a certain time, or a time obtained by multiplying a certain wait time by a predetermined value that is greater than 1 (such as a time double a certain wait time).

Figure 15:
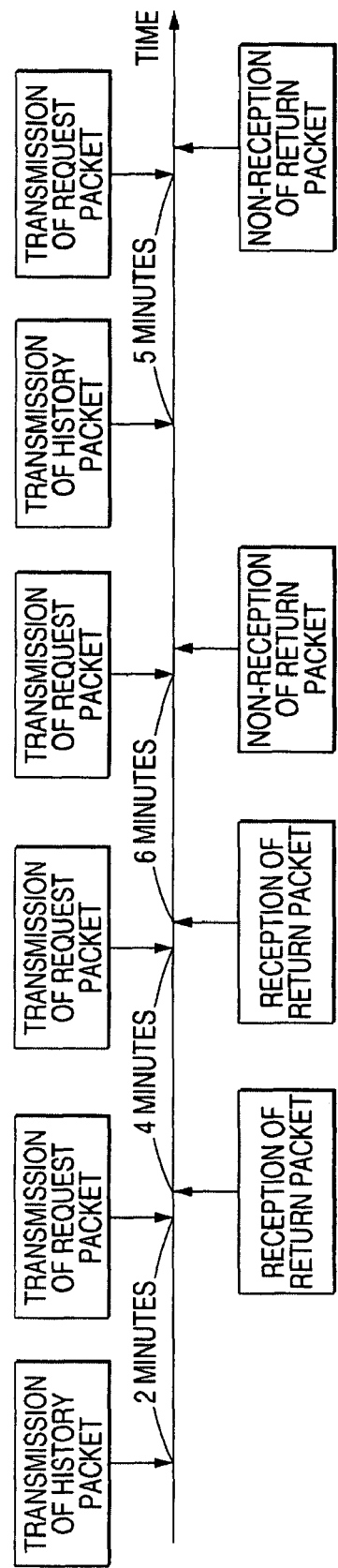
FIG. 15 explains transmission/reception of packets according to Embodiment 1.

In this example, processing related to storage of destination information into the server 3 or processing related to transmission of a return packet corresponding to a request packet is the same as that in Example 1 or Example 2, so that detailed description of the processing is omitted. FIG. 15 explains transmission of a history packet, transmission of a request packet, and reception (or non-reception) of a return packet in this example. In this example, it is assumed that the port keeping time of the communication processor 2 is "5 minutes 30 seconds".

In this case, a case will be described where the packet transmission controller 13 controls the request packet transmitter 12 so that, in case a return packet corresponding to a transmitted request packet is received by the return packet receiver 14 and a return packet has not been received by the return packet receiver 14, the next wait time will be a time obtained by adding 2 minutes to a wait time corresponding to the received return packet. In this example, as mentioned above, it is assumed that, in case a request packet has been transmitted four times, the packet transmission controller 13 determines that timing is met for detecting a port keeping time.

Determining that hat timing is met for detecting a port keeping time, the packet transmission controller 13 of the information processor 1 sets the wait time to 2 minutes (step S101). After that, under the control of the packet transmission controller 13, a history packet is transmitted from the information processor 1 to the server 3 (step S102). The packet transmission controller 13 and the port keeping time detector 15 start time counting on respective timers from the point in time a history packet is transmitted.

The packet transmission controller 13 determines whether the preset wait time "2 minutes" has elapsed since time counting started, and when the timer value has indicated 2 minutes, determines that timing is met for transmitting a request packet (step S201). A request packet is transmitted from the request packet transmitter 12 to the server 3 (step S104). The packet transmission controller 13 retains the then timer value "2 minutes" as a wait time with the timing a request packet is transmitted. The port keeping time detector 15 acquires the then timer value "2 minutes" with the timing a request packet is transmitted, and temporarily retains the timer value. It is assumed that time counting by the port keeping time detector 15 is under way.

A return packet transmitted from the server 3 in response to the request packet reaches the history port of the communication processor 2. The port keeping time "5 minutes 30 seconds" has not elapsed so that the return packet undergoes address conversion and is transmitted to the information processor 1. The return packet is received by the return packet receiver 14 (step S105) and a notice is passed to the packet transmission controller 13 and the port keeping time detector 15 that a return packet has been successfully received. The port keeping time detector 15 terminates time counting at the point in time and retains the then timer value "2 minutes 1 second" as a wait time during which a return packet has been successfully received. The port keeping time detector 15 discards the wait time "2 minutes" temporarily stored at the time of transmission of a request packet (step S107). The packet transmission controller 13 retains the wait time "2 minutes" as a wait time during which a return packet has been successfully received. The packet transmission controller 13 and the port keeping time detector 15 start time counting anew on respective timers when the return packet is received.

A request packet having been transmitted once, the packet transmission controller 13 determines that timing is not met for detecting a port keeping time (step S108). A return packet corresponding to the wait time "2 minutes" transmitted for the first time having been received, the packet transmission controller 13 determines that a return packet has not been received so far (steps S401, S501) and sets the wait time "4 minutes" obtained by adding 2 minutes to the wait time "2 minutes" during which a return packet has been successfully received (steps S502, S110). When the timer value has indicated 4 minutes, the packet transmission controller 13 determines that timing is met for transmitting a request packet (steps S202, S201). A request packet is transmitted from the request packet transmitter 12 to the server 3 (step S104). The packet transmission controller 13 retains the then timer value "4 minutes" as a wait time with the timing a request packet is transmitted. The port keeping time detector 15 acquires the then timer value "4 minutes" with the timing a request packet is transmitted, and temporarily retains the timer value. It is assumed that time counting by the port keeping time detector 15 is under way.

A return packet transmitted from the server 3 in response to the request packet reaches the history port of the communication processor 2. The port keeping time "5 minutes 30 seconds" has not elapsed so that the return packet undergoes address conversion and is transmitted to the information processor 1. The return packet is received by the return packet receiver 14 (step S105) and a notice is passed to the packet transmission controller 13 and the port 15, keeping time detector 15 that a return packet has been successfully received. The port keeping time detector 15 terminates time counting at the point in time and retains the then timer value "4 minutes 1 second" as a wait time during which a return packet has been successfully received. The port keeping time detector 15 discards the wait time "4 minutes" temporarily stored at the time of transmission of a request packet (step S107). The packet transmission controller 13 retains the wait time "4 minutes" as a wait time during which a return packet has been successfully received. The packet transmission controller 13 and the port keeping time detector 15 start time counting anew on respective timers when the return packet is received.

After that, same as the above description, setting of the wait time "6 minutes" (steps S108, S110) and transmission of a request packet (steps S202, S201, S104) are repeated. A return packet transmitted from the server 3 in response to the request packet is not transmitted to the information processor 1 because the port keeping time "5 minutes 30 seconds" of the communication processor 2 has elapsed. As a result, the information processor 1 determines that a time-out has occurred (step S106). The port keeping time detector 15 retains the wait time "6 minutes" temporarily stored at the time of transmission of a request packet as a wait time during which a return packet has not been received. The packet transmission controller 13 retains the wait time "6 minutes" as a wait time during which a return packet has not been received.

Three request packets having been transmitted, the packet transmission controller 13 determines that a port keeping time will not be detected (step S108). In this case, a return packet corresponding to the wait time of 6 minutes has not been received by the return packet receiver 14 (step S401) and one or more return packets have been successfully received by the return packet receiver 14 so far (step S403), the middle wait time "5 minutes" between the wait time "6 minutes" corresponding to the return packet that has not been received and the longest wait time "4 minutes" of the wait times corresponding to the return packets that has been successfully received by the return packet receiver 14 so far is set (steps S404, S110). In this case, a return packet has not been received (step S202), so that a history packet is transmitted again and the packet transmission controller 13 and the port keeping time detector 15 start time counting on respective timers at the point in time the history packet is transmitted (step S102). When the timer value has indicated "5 minutes", it is determined that timing is met for transmitting a request packet and a request packet is transmitted (steps S201, S104).

The port keeping time "5 minutes 30 seconds" of the communication processor 2 has not elapsed so that a return packet transmitted from the server 3 undergoes address conversion in the communication processor 2 and is then transmitted to the information processor 1. The return packet is successfully received by the return packet receiver 14 and a notice is passed to the packet transmission controller 13 and the port keeping time detector 15 that a return packet has been successfully received (step S105). The port keeping time detector 15 retains the wait time "5 minutes 1 second" as a wait time during which a return packet has been successfully received (step S107).

Four request packets having been transmitted, the packet transmission controller 13 determines that timing is met for detecting a port keeping time (step S108) and passes an indication to detect a port keeping time to the port keeping time detector 15. The port keeping time detector 15 sets as the port keeping time of the communication processor 2 the longest wait time "5 minutes 1 second" of the wait times "2 minutes 1 second", "4 minutes 1 second" and "5 minutes 1 second" during which a return packet has been successfully received, in response to the instruction (step S109).

While each of the packet transmission controller 13 and the port keeping time detector 15 has a timer in the above examples, the packet transmission controller 13 and the port keeping time detector 15 may perform time counting on a single timer.

As mentioned above, with the information processing system according to this embodiment, the information processor 1 may determine whether the port keeping time of the communication processor 2 is longer than its wait time and thus detect the port keeping time of the communication processor 2 by setting a wait time in the information processor 1 and requesting the server 3 to transmit a return packet at the end of the wait time. In the processing of detecting the port keeping time, the server 3 has only to store destination information based on a history packet and to transmit a return packet in response to reception of a request packet. This approach reduces the processing load on the server 3 compared with a case where control of the timing for transmitting a return packet based on a wait time is made by the server 3. As a result, it is possible to provide an information processing system that does not burden the server 3 with a heavy load.

By using the binary search method to set a wait time in the information processor 1 it is possible to efficiently detect a port keeping time. To be more specific, in case the port keeping time of the communication processor 2 is 5 minutes 30 seconds and the binary search method is used, it is possible to detect that the port keeping time is 5 minutes 1 second when approximately 17 minutes have elapsed since transmission of the first history packet as explained using FIG. 15. The error in the port keeping time in this case is 1 minute. This is because the difference between a wait time corresponding to the request packet transmitted last and a wait time corresponding to the request packet transmitted last but one is 1 minute. In case a port keeping time is detected at a time in point a return packet corresponding to a request packet has not been received while a return packet is being transmitted starting with the wait time of 2, minutes and in increments of 1 minute, total five packets whose wait times are 2 minutes, 3 minutes, 4 minutes, 5 minutes and 6 minutes. This takes 20 minutes until a port keeping time is detected. The error in the port keeping time is 1 minute in this case, since the wait time is added increments of 1 minute. In this way, it is understood that the port keeping time is efficiently detected by the use of the binary search method.

By appropriately setting the timing for detecting a port keeping time, it is possible to detect a port keeping time with necessary and sufficient accuracy. For example, in case it is necessary to detect a precise port keeping time, the number of request packets to be transmitted before a port keeping time is detected should be set to a large value. To detect an approximate port keeping time, a smaller number of request packets may be transmitted before a port keeping time is detected.

While the destination information stored by the destination information storage 34 includes the port number of a history port and the address of the communication processor 2 on the side of the communication circuit 100 in this embodiment, the destination information may include the port number of a history port alone. In this case, the server 3 may acquire the address of the communication processor 2 on the side of the communication circuit 100 from a source address included in the header of a request packet.

Embodiment 2

An information processing system according to Embodiment 2 of the invention will be described referring to drawings. In the information processing system according to this embodiment, a request packet transmitted from an information processor to a server includes destination information as information on the destination of a return packet.

Figure 16:
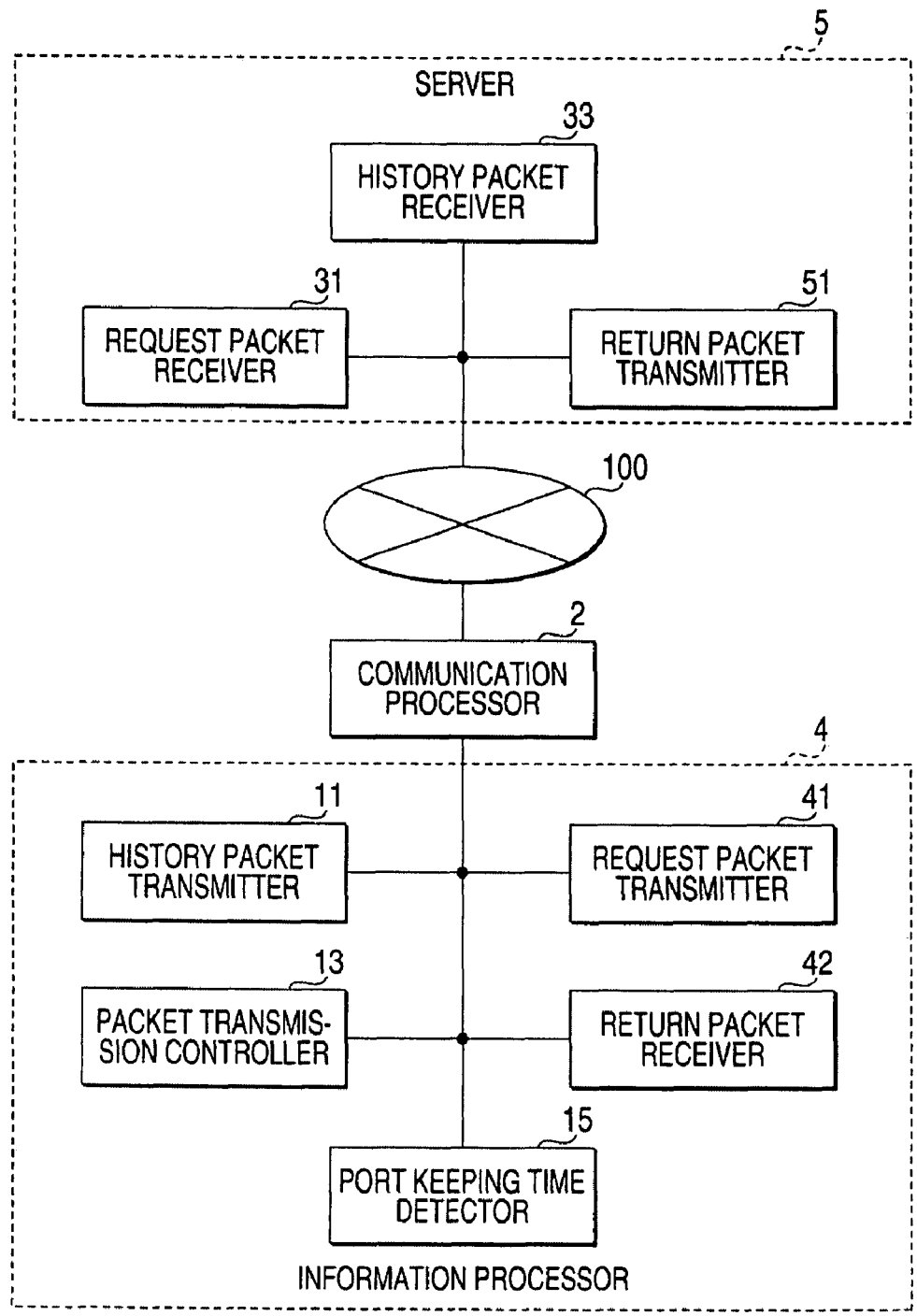
FIG. 16 is a block diagram showing the configuration of an information processing system according to Embodiment 2 of the invention.

FIG. 16 is a block diagram showing the configuration of an information processing system according to this embodiment. In FIG. 16, the information processing system according to this embodiment comprises an information processor 4, a communication processor 2 and a server 5. The information processing system according to this embodiment is the same as the information processing system according to Embodiment 1 except that the information processor 1 is replaced with the information processor 4 and the server 3 is replaced with the server 5.

The information processor 4 includes a history packet transmitter 11, a request packet transmitter 41, a packet transmission controller 13, a return packet receiver 42 and a port keeping time detector 15. The history packet transmitter 11, the packet transmission controller 13 and the port keeping time detector 15 are same as those in Embodiment 1 and the corresponding description is omitted.

The request packet transmitter 41 is similar to the request packet transmitter 12 according to Embodiment 1. Note that a request packet transmitted by the request packet transmitter 41 includes destination information as information on the destination of a return packet. The destination information is composed of information indicating the position of a history port included in a return packet received by the return packet receiver 42 described later and information indicating the address, of the communication processor 2 on the side of the communication circuit 100.

The return packet receiver 42 is similar to the return packet receiver 14 according to Embodiment 1. Note that the return packet receiver 42 receives a return packet including information indicating the position of a history port transmitted from the server 5 and information indicating the address of the communication processor 2 on the side of the communication circuit 100.

In case two or more components of the history packet transmitter 11, request packet transmitter 41 and return packet receiver 42 each has a device related to communications, the devices may be the same means or separate means.

The server 5 includes a request packet receiver 31, a history packet receiver 33 and a return packet transmitter 51. The request packet receiver 31 and the history packet receiver 33 are same as those in Embodiment 1 and the corresponding description is omitted.

The return packet transmitter 51 is similar to the return packet transmitter 32 according to Embodiment 1. Note that the return packet transmitter 51 transmits a return packet based on the destination information included in a request packet received by the request packet receiver 31. That is, the return packet transmitter 51 transmits a return packet to the address and the port number indicated by the destination information included in a request packet. In case the history packet receiver 33 has received a history packet, the return packet transmitter 51 transmits to the information processor 4 a return packet including information indicating the position of a history port as a port of the communication processor 2 where the history packet has passed and the information indicating the address of the communication processor 2 on the side of the communication circuit 100. The return packet transmitter 51 may use the source address and the source port number included in the header of a history packet respectively as the information indicating the position of a history port and the information indicating the address of the communication processor 2 on the side of the communication circuit 100. A return packet transmitted in case a request packet is received is called the "return packet corresponding to a request packet" same as Embodiment 1 and a return packet transmitted in case a history packet is received is called the "return packet corresponding to a history packet".

In case two or more components of The request packet receiver 31, the history packet receiver 33, and the return packet transmitter 51 each has a device related to communications, the devices may be the same means or separate means.

The ports where a history packet, a request packet and a return packet pass will be described in detail. In this embodiment, there are two patterns a case where a return packet corresponding to a history packet passes through a history port and otherwise. A case where a return packet corresponding to a history packet passes through a history port is called Pattern X and a case where a return packet corresponding toga history packet does not pass through a history port is called Pattern Y. For Pattern X, ports where a history packet, a request packet and a return packet pass are same as those shown in FIG. 2 of Embodiment 1. For Pattern Y, as shown in FIG. 17, a return packet corresponding to a history packet is transmitted to the information processor 4 via Port P12. Port P2 is different from Port P12. While Embodiment 1 explains a case where all return packets are transmitted to a history port, a return packet corresponding to a history packet may be transmitted or not transmitted to a history port in this embodiment. For the information processor 4 to receive a return packet corresponding to a history packet, a return packet transmitted from the server 5 to Port P12 must undergo address conversion in the communication processor 2. Thus, for example, the information processor 4 may transmit a predetermined packet to the server 5 via Port P12 to be ready for receiving a return packet corresponding to a history packet. The information processor 4 may use a feature such as the UPnP (Universal Plug and Play) feature to set port mapping on the communication processor 2 so that a packet transmitted to Port P12 will be routed to Port P11 of the information processor 4 or may use another method. The server 5 may use any method to know the information indicating the position of Port P12, for example the port number of Port P12. For example, the payload of a history packet may include the information indicating the position of Port P12. The information indicating the position of Port P12 may be previously set to the server 5. Or any other method may be used by the server 5 to know the position of Port P12. While a return packet corresponding to a history packet is transmitted to the information processor 4 via the communication processor 2 in FIG. 17, a return packet corresponding to a history packet may be transmitted to the information processor 4 not via the communication processor 2. For example, in case the information processor 4 and the server 5 are capable of communicating via a communication circuit other than the communication circuit 100, a return packet corresponding to a history packet may be transmitted to the information processor 4 via a communication circuit separate from the communication circuit 100 instead of via the communication processor 2.

Next, detection of a port keeping time will be described focusing on a single history port. Definition of a port keeping time is the same as that in Embodiment 1. For Pattern X, a return packet is transmitted from the server 5 just after a history packet is transmitted from the information processor 4 so that the wait time is exclusively as shown in Pattern 2 in FIG. 3B. A return packet that passes through the communication processor 2 at the beginning of the wait time in Pattern 2 is not a return packet corresponding to a request packet but a return packet corresponding to a history packet. For pattern Y, a return packet corresponding to a history packet does not pass through a history port so that the wait time belongs to Pattern 1 shown in FIG. 3A or Pattern 2 shown in FIG. 3B.

Next, the beginning of a wait time will be described. For Pattern Y shown in FIG. 17, a return packet corresponding to a history packet does not pass through a history port so that Patterns A and B described in Embodiment 1 may be used as a pattern of the beginning of a wait time. For Pattern X shown in FIG. 2, a return packet corresponding to a history packet also passes through a history port so that the pattern of the beginning of a wait time is different from Pattern A or B. There are two patterns. In the first pattern, a packet that passes through a history port at the beginning of a wait time is always a return packet corresponding to a history packet ("Pattern F"). In the second, when the information processor 4 has successfully received a return packet corresponding to a request packet, the return packet is assumed as a packet that passes through a history port at the beginning of a wait time, and when the information processor 4 has failed to receive a return packet corresponding to a request packet, a new history packet is transmitted and a return packet corresponding to the history packet is assumed as a packet that passes through a history port at the beginning of a wait time ("Pattern G"). Note that any other pattern may be used and the invention is not limited to these patterns.

[Pattern F]

Figure 18A:
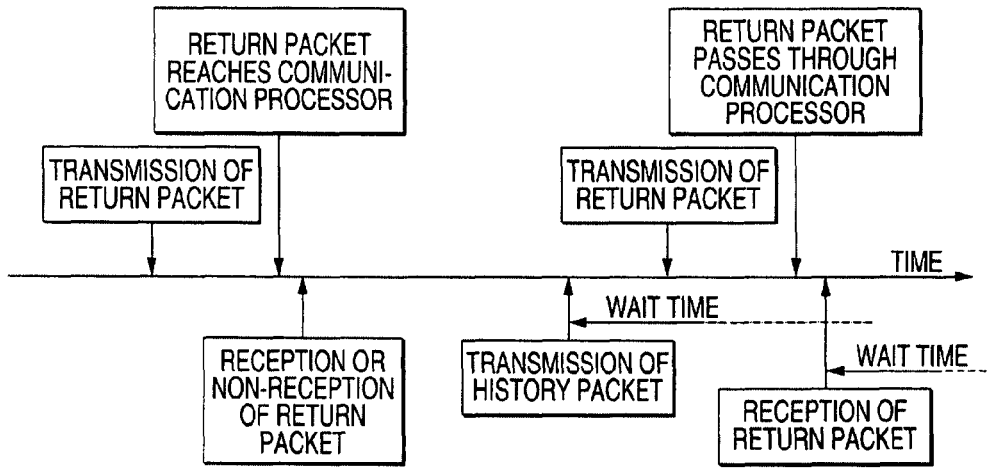
FIG. 18A explains the beginning of a wait time according to Embodiment 2.

FIG. 18A explains Pattern F. In Pattern F, same as in FIG. 4A, the information processor 4 transmits a history packet at the beginning of a wait time irrespective of whether the information processor 4 has successfully received a return packet. In Pattern F, a packet that passes through a history port at the beginning of a wait time is return packet corresponding to the transmitted history packet. The packet transmission controller 13 controls transmission of a request packet as well as transmission of a history packet by the history packet transmitter 11 at the beginning of a wait time. In other words, the packet transmission controller 13 controls the history packet transmitter 11 so that a history packet will be transmitted at the beginning of a wait time.

Strictly speaking, as shown in FIG. 3B, the beginning of a wait time is a point in time a return packet corresponding to a history packet passes through the communication processor 2 although it is difficult for the information processor 4 to know the point in time a return packet passes through the communication processor 2. Thus, as shown in FIG. 18A, the port keeping time detector 15 may assume that a point in time a return packet corresponding to a history packet passes through the communication processor 2 as the beginning of a wait time is a point in time the history packet is transmitted or a point in time a return packet corresponding to the history packet is received. While two or more request packets are transmitted in FIG. 18A, a single request packet may be transmitted by the information processor 4.

[Pattern G]

Figure 18B:
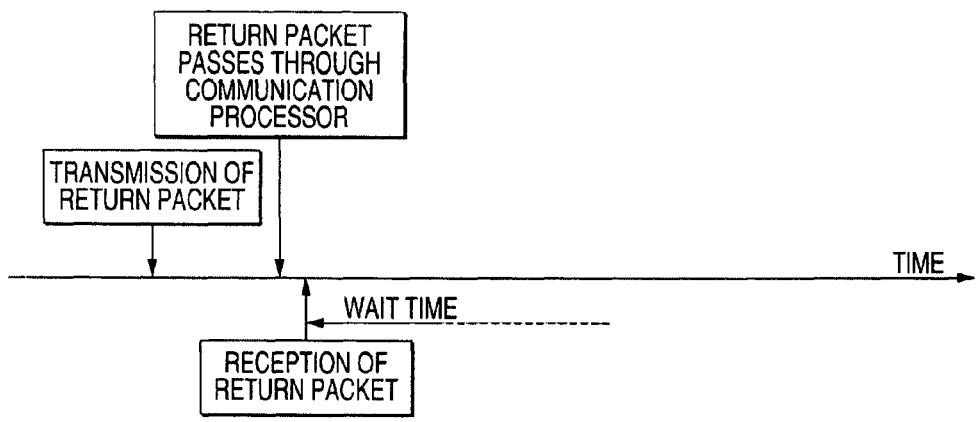
FIG. 18B explains the beginning of a wait time according to Embodiment 2.
Figure 18C:
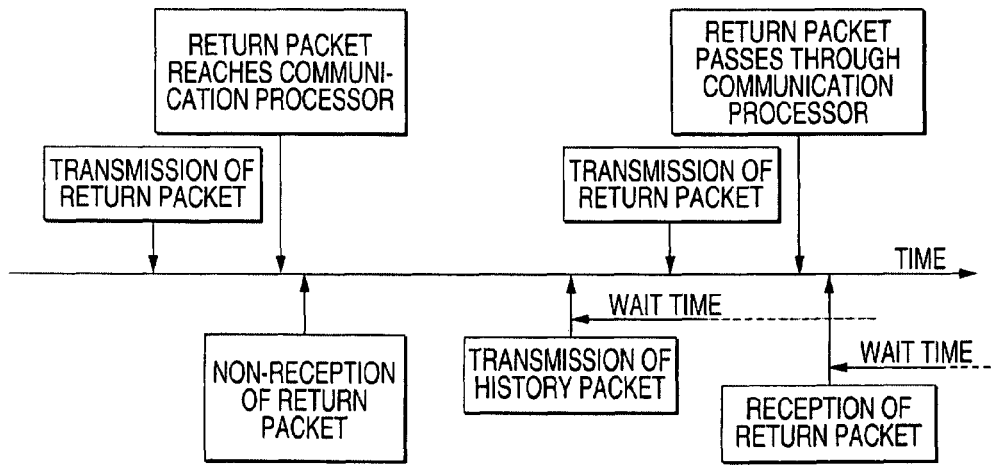
FIG. 18C explains the beginning of a wait time according to Embodiment 2.

FIGS. 18B and 18C explain Pattern G. In Pattern G, a packet that passes through a history port at the beginning of a wait time is a return packet corresponding to a history packet or a return packet corresponding to a request packet. In case the information processor 4 has successfully received a return packet corresponding to a request packet, the information processor 4 does not transmit a history packet at the beginning of a wait time as shown in FIG. 18B and the return packet is a packet that passes through a history port at the beginning of a wait time. In case the information processor 4 has failed to receive a return packet corresponding to a request packet, the information processor 4 transmits a history packet at the beginning of a wait time as shown in FIG. 18C and a return packet corresponding to the history packet is a packet that passes through a history port at the beginning of a wait time. The packet transmission controller 13 controls transmission of a request packet as well as controls the history packet transmitter 11 to engage the history packet transmitter 11 to transmit a history packet at the beginning of a next wait time in case the return packet receiver 14 has failed to receive a return packet corresponding to a request packet.

Strictly speaking, as shown in FIG. 3B, the beginning of a wait time is a point in time a return packet passes through the communication processor 2 although it is difficult for the information processor 4 to know the point in time a return packet passes through the communication processor 2. Thus, as shown in FIGS. 18B and 18C, in the port keeping time detector 15, in case a packet passing through a history port at the beginning of a wait time is a return packet corresponding to a history packet, a point in time a packet passes through a history port as the beginning of a wait time may be a point in time a history packet is transmitted or a point in time a return packet corresponding to a history packet is received, and in case a packet passing through a history port at the beginning of a wait time is a return packet corresponding to a request packet, a point in time a packet passes through a history port as the beginning of a wait time may be a point in time a return packet corresponding to a request packet is received.

For the end of a wait time, same as Embodiment 1, Patterns C to E may be used. These patters have been described in Embodiment 1 so that the corresponding description is omitted. Note that any other pattern may be used and the invention is not limited to these three patterns.

Description of control of transmission of a request packet by the packet transmission controller 13, the timing with which the port keeping time detector 15 detects a port keeping time, and the binary search method is the same as that in Embodiment 1 so that the corresponding description is omitted.

Next, operation of the information processor 4 according to this embodiment will be described using a flowchart. In this embodiment, same as Embodiment 1, the flowchart used depends on the pattern of the beginning of a wait time. Thus, respective flowcharts for Patterns A, B, F and G will be described.

Figure 19:
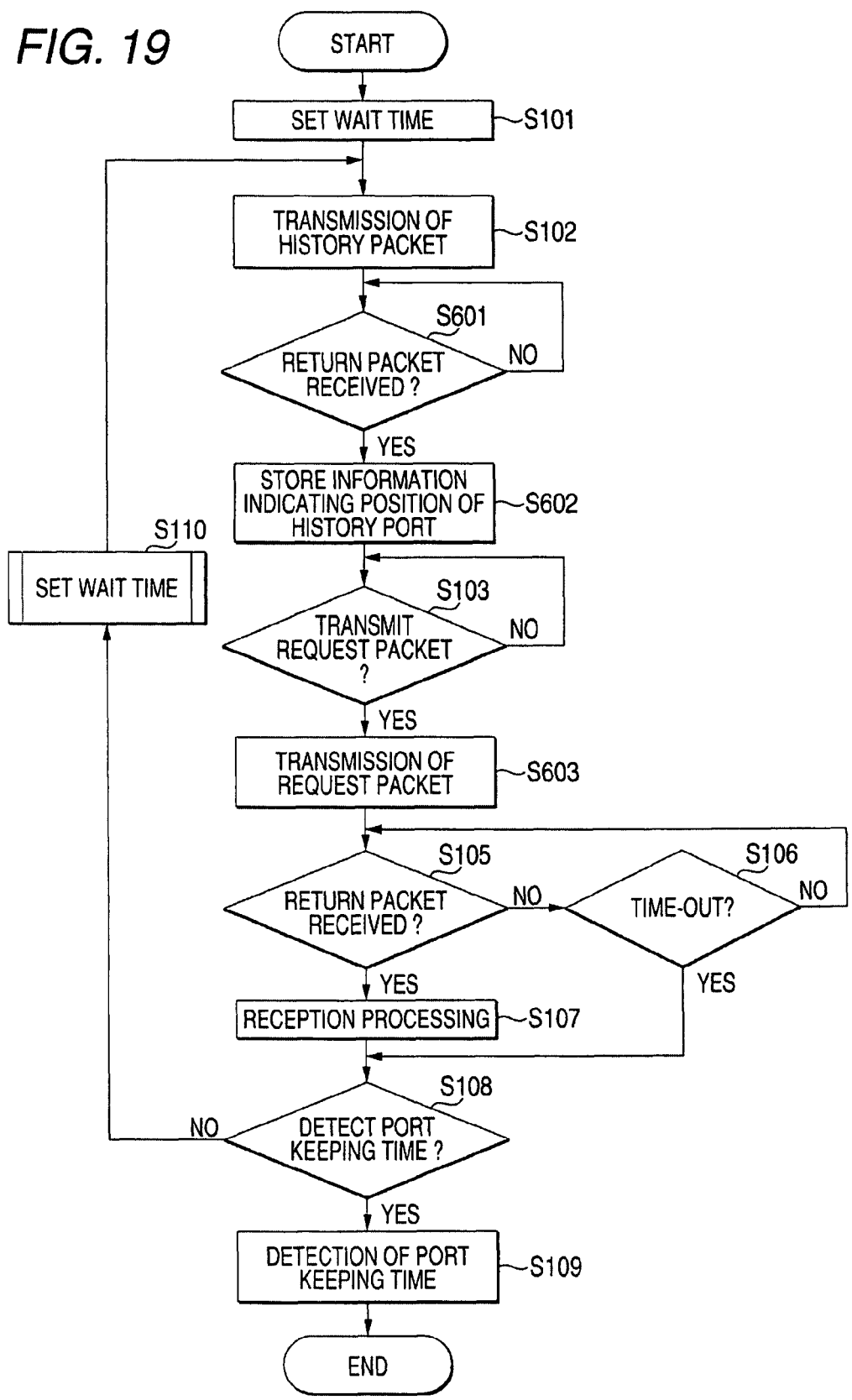
FIG. 19 is a flowchart showing the operation of an information processor according to Embodiment 2.

FIG. 19 is a flowchart showing the operation of the information processor 4 according to this embodiment in Pattern A or F. Processing except steps S601 to S603 is the same as that in the flowchart of FIG. 6 according to Embodiment 1 so that the corresponding description is omitted. For Pattern F, the beginning of a wait time may be a point in time a history packet is transmitted or a point in time a return packet corresponding to a history packet is received in the determination of timing for transmitting a request packet in step S103 or the processing of measuring the wait time by the port keeping time detector 15.

(Step S601)

The return packet receiver 42 determines whether a return packet corresponding to a history packet has been successfully received. In case a return packet has been received, execution proceeds to S602. Otherwise, processing in step A601 is repeated until a return packet is received. In case a return packet is not received because the server 5 is down or for other reasons, the return packet receiver 42 may determine that a time-out has occurred when a predetermined time such as 1 minute has elapsed since a history packet was transmitted and terminate a series of processing.

(Step S602) The request packet transmitter 41 temporarily stores the information indicating the position of a history port and information indicating the address of the communication processor 2 on the side of the communication circuit 100 included in a return packet received by the return packet receiver 42. In case the return packet receiver 42 has received a return packet corresponding to a history packet anew, the request packet transmitter 41 temporarily stores the information indicating the position of a history port and information indicating the address of the communication processor 2 on the side of the communication circuit 100 in a way such information items are easily identified. For example, the request packet transmitter 41 may store such information by way of overwriting.

(Step S63) The packet transmission controller 13 controls the request packet transmitter 41 to engage the request packet transmitter 41 to transmit a request packet to the server 5. As a result, a request packet is transmitted from the request packet transmitter 41 to the server 3. The request packet includes destination information such as information indicating the position of a history port temporarily stored by the request packet transmitter 41 and information indicating the address of the communication processor 2 on the side of the communication circuit 100.

While the information indicating the position of a history port and the information indicating the address of the communication processor 2 on the side of the communication circuit 100 are temporarily stored in the request packet transmitter 41 in this flowchart, this is an example and such information may be stored elsewhere than the request packet transmitter 41. Note that the request packet transmitter 41 must have an access to such information before transmitting a request packet.

Figure 20:
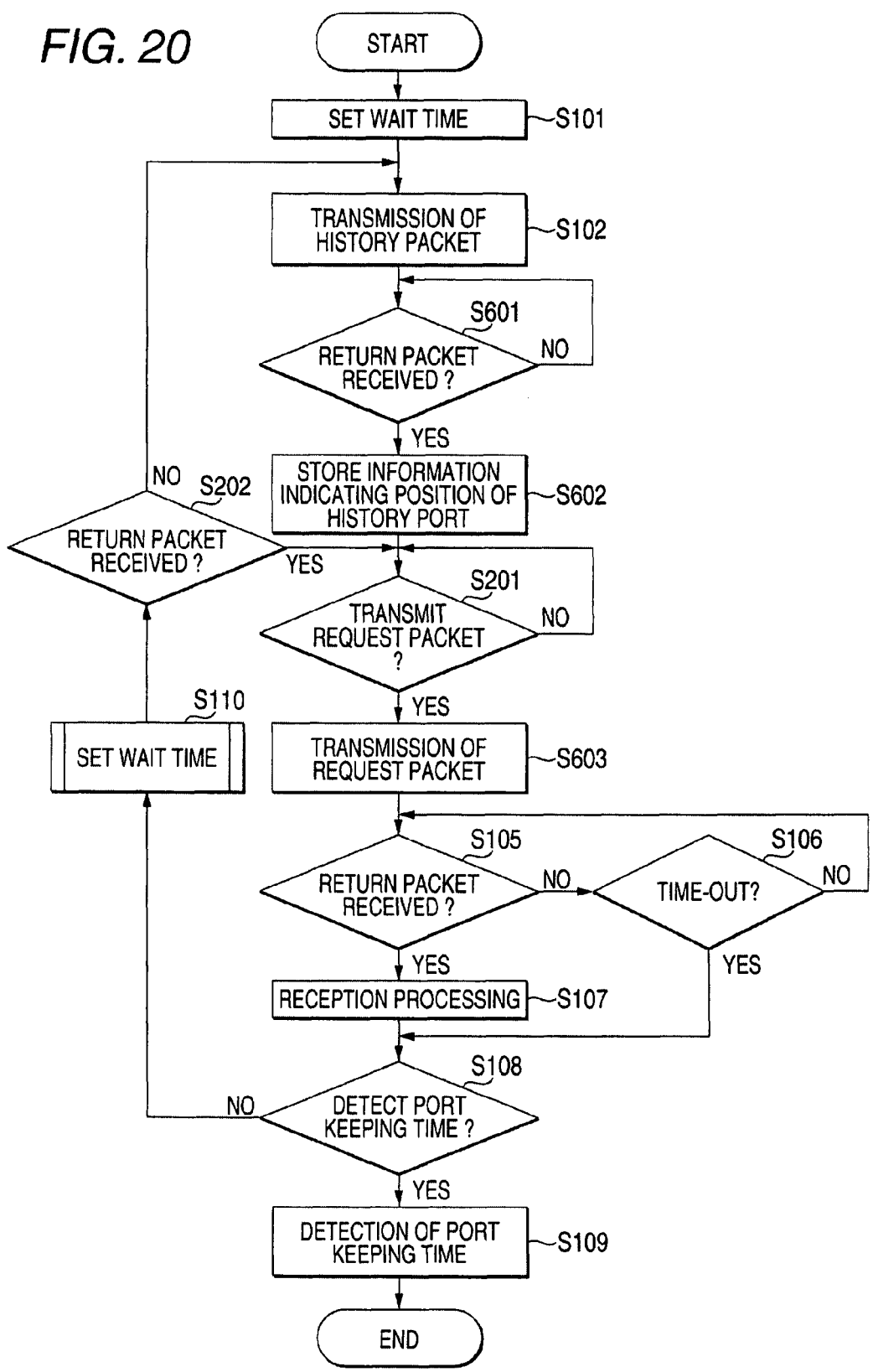
FIG. 20 is a flowchart showing the operation of the information processor according to Embodiment 2.

FIG. 20 is a flowchart showing the operation of the information processor 4 according to this embodiment in Pattern B or G. Processing except steps S601 to S603 is the same as that in the flowchart of FIG. 7 according to Embodiment 1 so that the corresponding description is omitted. The processing of steps S601 to S603 is the same as that in the flowchart of FIG. 19. For Pattern G, the beginning of a wait time may be a point in time a history packet is transmitted or a point in time a return packet corresponding to a history packet is received in the determination of timing for transmitting a request packet in step S201 after a history packet was transmitted at the beginning of a wait time or the processing of measuring the wait time by the port keeping time detector 15.

Operation of the server 5 according to this embodiment will be described using the flowchart of FIG. 21. Processing in steps S301 and S303 is the same as that in the flowchart of FIG. 8 according to Embodiment 1 so that the corresponding description is omitted.

(Step S701) The return packet transmitter 51 reads a source address and a source address port number included in the history packet received by the history packet receiver 33 and transmits a return packet including the source address and the source address port number to the information processor 4. Execution then returns to step S301. The return packet transmitter 51 transmits the return packet to a history port, that is, to the source port of the history packet for Pattern X and to the information processor 4 while bypassing a history port for Pattern Y.

(Step S702) The return packet transmitter 51 reads destination information from the payload of a request packet received by the request packet receiver 31.

(Step S703) The return packet transmitter 51 transmits a return packet to the address and the port number indicated by the readout destination information. Execution then returns to step S301.

Figure 21:
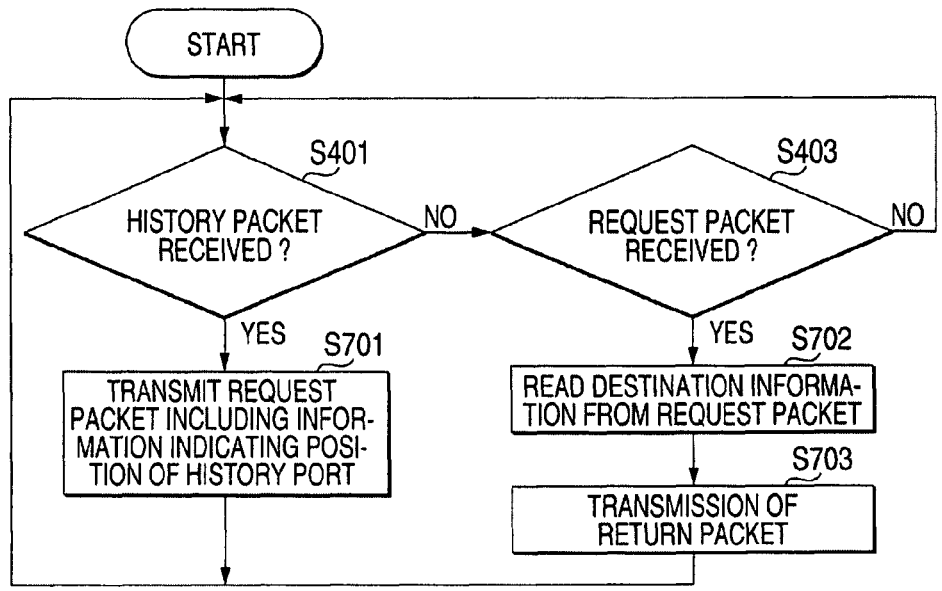
FIG. 21 is a flowchart showing the operation of a server according to Embodiment 2.
Figure 22A:
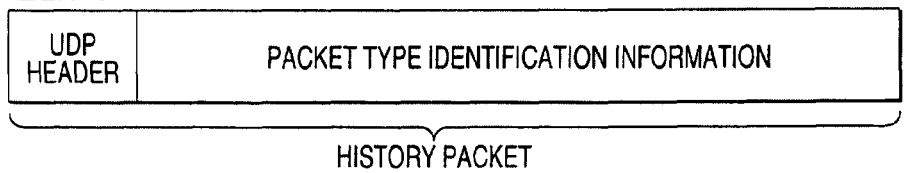
FIG. 22A shows an example of packet structure according to Embodiment 2.
Figure 22B:
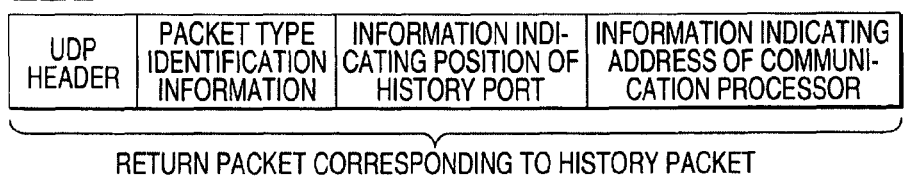
FIG. 22B shows an example of packet structure according to Embodiment 2.
Figure 22C:
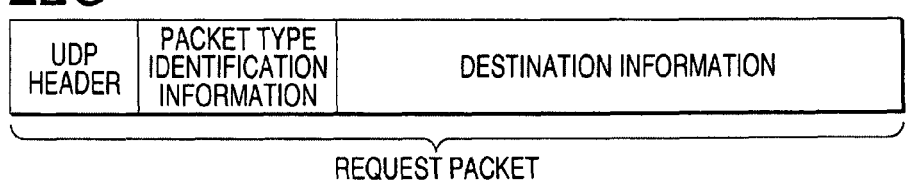
FIG. 22C shows an example of packet structure according to Embodiment 2.
Figure 22D:
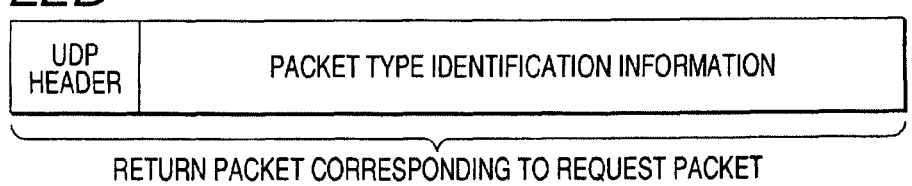
FIG. 22D shows an example of packet structure according to Embodiment 2.

In the flowchart of FIG. 21, processing is terminated by power off or a processing termination interrupt.

Operation of the information processing system according to this embodiment will be described using a specific example. In this example, a case is described where Pattern C is used as the end of a wait time in Pattern F.

The following example is the same as Example 1 in Embodiment 1, except that the transmission control of a packet is made using Pattern F and the destination of a return packet is communicated from the information processor 4 to the server 5. For example, the port keeping time of the communication processor 2 is "1 minute 20 seconds" and the packet transmission controller 13 set a wait time in accordance with the flowchart of FIG. 10.

FIGS. 22A to 22D show the structure of a history packet, a return packet corresponding to a history packet, a request packet and a return packet corresponding to a request packet, respectively. Each of the history packet, request packet and return packet has a UDP header and includes packet type identification information. The payload of a return packet corresponding to a history packet includes information indicating the position of a history port and the address of the communication processor 2 on the side of the communication circuit 100. The payload of a request packet includes destination information.

In this example also, FIG. 12 explains transmission of a history packet, transmission of a request packet, and reception (or non-reception) of a return packet, the same as Example 1 of Embodiment 1.

Determining that timing is met for detecting a port keeping time, the packet transmission controller 13 of the information processor 4 sets a wait time of 2 minutes (step S101). After that, under the control of the packet transmission controller 13, a history packet is transmitted from the information processor 4 to the server 5 (step S102).

The history packet is received by the history packet receiver 33 of the server 5 and passed to the return packet transmitter 51 (step S301). The return packet transmitter 51 reads the reads the source address "202.224.135.10" and the source port number "12345" from the header of the history packet. The return packet transmitter 51 then assembles a return packet including the source address and the source port number in its payload and transmits the return packet to the source address and the source port (step S701).

A return packet corresponding to the history packet reaches the history port of the communication processor 2 and undergoes address conversion, and is then transmitted to the information processor 4. The return packet receiver 42 of the information processor 4 receives the return packet and passes the return packet to the request packet transmitter 41 (step S601). The packet transmission controller 13 and the port keeping time detector 15 start time counting on respective timers when a return packet corresponding to the history packet is received. The request packet transmitter 41 reads the address "202.224.135.10" of the communication processor 2 on the side of the communication circuit 100 and the port number "12345" of the history port from the payload of a return packet received from the return packet receiver 42, and temporarily stores the information into a memory (not shown) (step S602).

After that, the packet transmission controller 13 determines whether the wait time "2 minutes" set in step S101 has elapsed. When the timer value has indicated 2 minutes, the packet transmission controller 13 determines that timing is met for transmitting a request packet (step S103). The packet transmission controller 13 controls the request packet transmitter 41 to engage the request packet transmitter 41 to transmit a request packet. As a result, a request packet including destination information is transmitted from the request packet transmitter 41 to the server 5 (step S603). The destination information includes the address "202.224.135.10" of the communication processor 2 on the side of the communication circuit 100 and the port number "12345" of the history port. The packet transmission controller 13 and the port keeping time detector 15 stops time counting with the timing a request packet is transmitted and retain the then timer value "2 minutes" as a wait time.

The request packet is received by the request packet receiver 31 of the server 5 and is passed to the return packet transmitter 51 (step S303). The return packet transmitter 51 reads destination information from the payload of the request packet (step S702) and transmits a return packet to the address "202.224.135.10" and the port number "12345" indicated by the destination information (step S703). The return packet reaches Port 12345 of the communication processor 2 and is not transmitted to the information processor 4 because the port keeping time "1 minute 20 seconds" related to the port has elapsed. The information processor 42 of the information processor 4 determines that a time-out has occurred at the point in time 10 seconds have elapsed since a request packet was transmitted (step S106) and passes a notice to the packet transmission controller 13 and the port keeping time detector 15 that a return packet has not been received. The packet transmission controller 13 and the port keeping time detector 15 retain the notice that a return packet related to the wait time "2 minutes" has not been received.

A request packet has not been transmitted four times and a return packet corresponding to a request packet transmitted in the first transmission has not been received. Thus, the packet transmission controller 13 determines that transmission of a request packet will be continued (step S108) and sets the wait time "1 minute", same as Example 1 in Embodiment 1 (step S101). After that, same as the above description, transmission of a history packet, reception of a return packet corresponding to a history packet, and storage of the port number of a history port take place (steps S102, S601, S602). While in this case the same address and port number as those in the first transmission of a history packet are included in a return packet transmitted from the server 5, the request packet transmitter 41 stores the address and the like by way of overwriting. Then, transmission of a request packet and the like are repeated.

In this example, a return packet transmitted at the end of the wait time "1 minute" in response to a request packet is received by the information processor 4. A return packet transmitted at the end of the wait time "1 minute 30 seconds" in response to a request packet does not undergo address conversion because the port keeping time "1 minute 20 seconds" of the communication processor 2 has elapsed. A return packet transmitted at the end of the wait time "1 minute 15 seconds" in response to a request packet is received by the information processor 4.

A request packet having been transmitted four times, the packet transmission controller 13 determines that timing is met for detecting a port keeping time (step S108) and passes an indication to detect a port keeping time to the port keeping time detector 15. The port keeping time detector 15 sets as the port keeping time of the communication processor 2 the longer wait time "1 minute 15 seconds" of the wait times "1 minute" and "1 minute 15 seconds" during which a return packet has been successfully received, in response to the instruction (step S109). After that, the detected port keeping time is for example stored onto a predetermined storage medium (not shown) and is used as the transmission period of a packet to be periodically transmitted to the server 5, same as Embodiment 1.

While only an example corresponding to Example 1 in Embodiment 1 is described, examples in this embodiment corresponding to Examples 2 and 3 in Embodiment 1 are the same as Examples 2 and 3 in Embodiment 1 except that destination information is included in a request packet and that the beginning of a wait time may be a point in time a return packet corresponding to a history packet is received. The corresponding description is thus omitted.

As described above, the information processing system according to this embodiment is capable of detecting the port keeping time of the communication processor 2, same as Embodiment 1, without storing destination information in the server 5.

While in this embodiment a return packet corresponding to a history packet includes information indicating the position of a history port and the address of the communication processor 2 on the side of the communication circuit 100, a return packet corresponding to a history packet may include information indicating the position of a history port alone. In such a case, the destination information included in a request packet may include or not include information indicating the address of the communication processor 2 on the side of the communication circuit 100. In the former case, the server 5 knows the address of the communication processor 2 on the side of the communication circuit 100 by acquiring a source address from the header of a request packet. In the latter case, the information processor 4 acquires the address of the communication processor 2 on the side of the communication circuit 100 by way of a method other than a return packet corresponding to a history packet. For example, the information processor 4 may acquire the address by using the UPnP feature. The information processor 4 may assemble a packet including in its payload the source address of a packet received, and transmit the packet to a predetermined server that transmits the packet to the source address of the packet received, if any, and receive the packet transmitted from the server in order to acquire the address of the communication processor 2 on the side of the communication circuit 100. The predetermined server may be the server 5 or any other server.

In the above embodiments, the packet transmission controller 13 may have a table shown in FIG. 23 and set a wait time by using the table. In the table shown in FIG. 23, information indicating a wait time is associated with a flag indicating whether the wait time is set and a next wait time. A wait time corresponding to the flag "1" is the preset wait time. In FIG. 23, the wait time "2 minutes" is set. In case a request packet transmitted from a server is received by an information processor at the end of the wait time "2 minutes", the next wait time is "4 minutes". Otherwise, the next wait time is "1 minute". For example, in case the net wait time is not specified as in the case of the wait time "3 minutes", a port keeping time is detected after it is determined whether a return packet transmitted at the end of the wait time has been successfully received. In this way, setting of a wait time may be made using a method other than those described in the foregoing embodiments. A method for setting a wait time is not limited to the method in above embodiments or a method described using FIG. 23.

While it is difficult for an information processor to know the ideal beginning or end of a wait time in the above embodiments so that the beginning or end of a wait time is measured by way of approximation, the approximation method is not limited to the above description. For example, a configuration is possible where a return packet transmitted from a server includes information indicating the transmission time of the return packet and an information processor uses the transmission time as a point in time the return packet has reached the history port of the communication processor 2.

In the above embodiments, the packet transmission controller 13 may control transmission of a request packet while considering the period from when a request packet is transmitted to when a return packet reaches the communication processor 2. Assuming the period from when a request packet is transmitted to when a return packet reaches the communication processor 2 as "T seconds" and the wait time is 30 seconds, the packet transmission controller 13 may make control to transmit a request packet when "30-T seconds" have elapsed since a history packet was transmitted.

While in the above embodiments, a request packet includes destination information concerning the destination of a return packet in case destination information is stored into a server based on a history port, a server may acquire information concerning the destination of a return packet by another method. For example, the user may manually set to a server the information indicating the position of a history port and the information indicating the address of the communication processor 2 on the side of the communication circuit 100. In this case, a history packet need not reach a server. Thus, adjustment of the lifetime of a history packet, for example TTL (Time to Live) may keep a history packet from reaching a server. Note that a history packet reaches at least the communication circuit 100 because it is necessary to leave a transmission history on a history port based on transmission of a history packet. In case a history packet does not reach a server, a server need not include a history packet receiver. Or, a server may transmit return packets to a plurality of ports of the communication processor 2 without specifying the destination of a return packet so that any one of the return packets will reach a history port.

A history packet, a request packet or a return packet transmitted/received in the communications according to the above embodiments may have any data capacity or structure.

While a history packet is transmitted by using only Port P2 of the communication processor 2 as shown in FIG. 2 or FIG. 17 in the above embodiments, each time a history packet is transmitted, the history packet may pass through a different port of the communication processor 2. Transmission of a history packet via a single port of the communication processor 2 means that a single port of the communication processor 2 is used at the same time. To be more precise, all of a plurality of history packets may be transmitted via a single port of the communication processor 2. Or, a plurality of history packets may be transmitted via two or more port of the communication processor 2. Even in the latter case, only a single port is used at a time so that two or more history packets are not transmitted simultaneously by using two or more ports.

While history packets, request packets and return packets are UDP packets in the above embodiments, these packets may be TCP packets or any other packets as long as it is possible to detect a port keeping time.

While the transmission timing of a request packet is counted on a timer in the above embodiments, a clock or a clock signal may be used instead of a timer and any other time counting means may be used.

While an information processor is connected to the communication circuit 100 via a single communication processor 2 in the above embodiments, an information processor may be connected to the communication circuit 100 via a plurality of communication processors (communication processors subjected to multistage connection may be configured). In this case, the shortest port keeping time is detected of all port keeping times of communication processors connected in multiple stages.

While the communication processor 2 has the NAT feature (that is, performs address conversion) in the above embodiments, the communication processor 2 may have the Firewall feature of packet filtering instead of or on top of the NAT feature. Packet filtering may refer to selection of a received packet that is based on the receiving filter rule mentioned earlier. It is possible to detect the port keeping time of the communication processor 2 having such a Firewall feature by using a method according to each of the above embodiments. The port maintenance time assumed in case the communication processor 2 has the Firewall feature refers to a predetermined time in a case a packet transmitted from the WAN to the port has not been transmitted to the LAN side of the communication processor 2 after the predetermined time has elapsed since the last packet passes through a port of the communication processor 2.

While a server may transmit a return packet when a predetermined time has elapsed since a request packet was transmitted in the above embodiments. For example, a server may transmit a return packet when 5 seconds have elapsed since a request packet was received. In this case, an information processor may set a wait time while considering the period from when the request packet is received by the server to when a return packet is transmitted. In this way, the return packet transmitter of a server may transmit a return packet after a predetermined time has elapsed since a request packet receiver received a request packet, or just after the request packet receiver has received a request packet as described in the above embodiments.

In the above embodiments, the packet transmission controller 13 may determine the timing to transmit a request packet so that, in case a return packet corresponding to a transmitted request packet has not been received by the return packet receivers 14, 42, and a return packet corresponding to one or more request packets has been successfully received by the return packet receivers 14, 42 so far, a wait time will be a wait time between a wait time (first wait time) corresponding to the return packet that has not been received and the longest wait time (second wait time) of a return packet, corresponding to a request packet, that has been successfully received by the return packet receivers 14, 42 so far, and control the request packet transmitters 12, 41 to engage the request packet transmitters 12, 41 to transmit a request packet with the timing determined. The packet transmission controller 13 may determine the timing to transmit a request packet so that, in case a return packet corresponding to a transmitted request packet has been successfully received by the return packet receivers 14, 42, and a return packet corresponding to a request packet has not been received by the return packet receivers 14, 42 so far, a wait time will be a wait time between a wait time corresponding to the return packet that has been successfully received and the shortest wait time of a return packet, corresponding to a request packet, that has not been received by the return packet receivers 14, 42 so far, and control the request packet transmitters 12, 41 to engage the request packet transmitters 12, 41 to transmit a request packet with the timing determined. The wait time between the first wait time and the second wait time may be a wait time obtained by adding a time obtained by multiplying the difference between the first wait time and the second wait time by $2/3$ to the first wait time.

In the above embodiments, setting of a wait time using the binary search method may be setting, as the wait time of the next request packet to be transmitted, a wait time between a wait time corresponding to a return packet that has been successfully received by the information processors 1, 4 and a wait time corresponding to a return packet that has not been received by the information processors 1, 4. In other words, the packet transmission controller 13 may determine the timing to transmit a request packet so that, in case a return packet corresponding to a transmitted request packet has not been received by the return packet receivers 14, 42, and a return packet corresponding to a request packet has not been received by the return packet receivers 14, 42 so far, a wait time will be shorter than a wait time (third wait time) corresponding to the return packet that has not been received, and control the request packet transmitters 12, 41 to engage the request packet transmitters 12, 41 to transmit a request packet with the timing determined. The wait time shorter than the third wait time refers to a time longer than 0 and shorter than the third wait time, and may be a time obtained by multiplying the third wait time by ⅔.

In the above embodiments, some of the UDP history packets, request packets and return packets that have been transmitted may not reach the destination because UDP is based on connectionless communications. For example, in case it is determined that a time-out has occurred after the information processor received a request packet, a request packet may be transmitted once again to check for the time-out. For example, two or more packets may be transmitted almost simultaneously considering that a UDP history packet, request packet or return packet transmitted does not reach the destination.

While a server is identified by an IP address in the above embodiments, a server may be identified by a domain name (such as server.pana.net). In this case, the server is identified because the domain name is converted to an IP address using a DNS server.

In the above embodiments, each process (each feature) may be provided through concentrated processing on a single device (system) or may be provided through distributed processing on multiple devices.

In the above embodiments, each component may be implemented by dedicated hardware. A component that may be implemented by software may be implemented by execution of a program. For example, each component may be implemented when a software program recorded in a recording medium such as a hard disk or a semiconductor memory may be read and executed by a program execution part such as a CPU. Software that implements an information processor in the above embodiments is the following program: A program for engaging a computer to perform processing in an information processor composing an information processing system comprising: an information processor; a server; and a communication processor for performing processing related to communications between the information processor and the server; the program executing: a history packet transmitting step of transmitting via a port of the communication processor a history packet as a packet for leaving a transmission history in the communication processor; a request packet transmitting step of transmitting to the server, via a port different from the history port as the port of the communication processor where the history packet has passed, a request packet as a packet for requesting transmission of a return packet as a packet to be transmitted from the server; a return packet receiving step of receiving a return packet transmitted from the server via the history port; and a port keeping time detecting step of detecting the port keeping time of the communication processor based on reception of a return packet in the return packet receiving step; wherein the program transmits a request packet in the request packet transmitting step by using a binary search method based on reception of a return packet by the return packet receiving step.

Software that implements a server in the above embodiments is the following program: A program for engaging a computer to perform processing in a server composing an information processing system comprising: an information processor; a server; and a communication processor for performing processing related to communications between the information processor and the server; wherein the information processor uses a binary search method to transmit to the server a request packet as a packet for requesting transmission of a return packet as a packet to be transmitted from the server to the information processor via the communication processor; the program executing: a request packet receiving step of receiving the request packet; and a return packet transmitting step of transmitting the return packet to a history port as a port of the communication processor where a history packet transmitted from the information processor in order to leave a transmission history in the communication processor upon reception of a request packet in the request packet receiving step.

In the above program, the transmitting step of transmitting information or receiving step of receiving information does not include processing performed by hardware such as processing performed in a modem or an interface card in the transmitting step (processing performed exclusively by hardware).

The program may be executed by downloading the same from a server or reading the program recorded on a predetermined recording medium including an optical disk such as a CD-ROM, a magnetic disk or a semiconductor memory.

A computer that executes this program may be a single or a plurality of computers. That is, concentrated processing or distributed processing may be performed.

The invention may be changed in a variety of ways and is not limited to the above embodiments.

INDUSTRIAL APPLICABILITY

As understood from the above, the information processing system or the like according to the invention is capable of detecting the port keeping time of a communication processor is useful as an information processor or the like comprising an information processor for transmitting a packet to a server or the like via the communication processor.

The invention claimed is:

1. An information processing system comprising: an information processor; a server; and a communication processor for performing processing on communications between said information processor and said server; said information processor including:
   a history packet transmitter for transmitting via a port of said communication processor a history packet as a packet for leaving a transmission history in said communication processor;
   a request packet transmitter for transmitting to said server, via a port different from a history port as the port of a communication processor where said history packet has passed, one or more request packets as packets for requesting transmission of a return packet as a packet to be transmitted from said server;
   a return packet receiver for receiving a return packet transmitted from said server via said history port;
   a packet transmission controller for controlling transmission of a request packet by said request packet transmitter by using a binary search method based on reception of a return packet by said return packet receiver; and
   a port keeping time detector for detecting the port keeping time of said communication processor based on reception of a return packet by said return packet receiver; said server including:

a request packet receiver for receiving said request packet; and a return packet transmitter for transmitting said return packet to said history port upon reception of a request packet by said request packet receiver.

2. The information processing system according to claim 1, said server further including:

a history packet receiver for receiving said history packet; and a destination information storage for storing destination information as information concerning the destination of said return packet based on a history packet received by said history packet receiver; wherein said return packet transmitter transmits said return packet based on the destination information stored by said destination information storage.

3. The information processing system according to claim 1, wherein said request packet includes destination information as information concerning the destination of said return packet and said return packet transmitter transmits said return packet based on the destination information included in a request packet received by said request packet receiver.

4. The information processing system according to claim 1, wherein said port keeping time detector detects said port keeping time based on a wait time during which said return packet receiver has successfully received a return packet that reached said communication processor at the end of a wait time among the wait times as times from a point in time a return packet reached said communication processor to a point in time a packet passed through said history port just before.

5. The information processing system according to claim 4, wherein said port keeping time detector detects said port keeping time based on a wait time during which said return packet receiver has successfully received a return packet that reached said communication processor at the end of the wait time and which is the longest wait time of said wait times.

6. The information processing system according to claim 4, wherein a packet that passes through said history port at the beginning of said wait time is said history packet and said packet transmission controller controls transmission of said request packet as well as controls transmission of a history packet by said history packet transmitter at the beginning of said wait time, wherein said port keeping time detector detects the port keeping time of said communication processor also based on transmission of a history packet by said history packet transmitter, and wherein in said port keeping time detector, a point in time a packet passed through said history port as the beginning of said wait time is a point in time said history packet was transmitted.

7. The information processing system according to claim 4, wherein a packet that passes through said history port at the beginning of said wait time is said history packet or said return packet, wherein said packet transmission controller controls transmission of said request packet as well as controls said history packet transmitter to engage the history packet transmitter to transmit a history packet at the beginning of a next wait time in case said return packet receiver has failed to receive a return packet corresponding to a request packet, wherein said port keeping time detector detects the port keeping time of said communication processor also based on transmission of a history packet by said history packet transmitter, and wherein, in said port keeping time detector, in case a packet that passes through said history port at the beginning of said wait time is said history packet, a point in time a packet passed through said history port as the beginning of said wait time is a point in time said history packet was transmitted, and in case a packet that passes through said history port at the beginning of said wait time is said return packet, a point in time a packet passed through said history port as the beginning of said wait time is a point in time said return packet was received.

8. The information processing system according to claim 3, said server further including a history packet receiver for receiving said history packet, wherein in case said packet receiver has received a history packet, said return packet transmitter transmits a return packet including at least information indicating the position of said history port, and wherein said destination information includes information indicating the position of said history port.

9. The information processing system according to claim 8, wherein said port keeping time detector detects said port keeping time based on a wait time during which said return packet receiver has successfully received a return packet that reached said communication processor at the end of a wait time among the wait times as times from a point in time a return packet reached said communication processor to a point in time a packet passed through said history port just before.

10. The information processing system according to claim 9, wherein said port keeping time detector detects said port keeping time based on a wait time during which said return packet receiver has successfully received a return packet that reached said communication processor at the end of the wait time and which is the longest wait time of said wait times.

11. The information processing system according to claim 9, wherein a return packet corresponding to said history packet is transmitted while bypassing said history port, wherein a packet that passes through said history port at the beginning of said wait time is said history packet and said packet transmission controller controls transmission of said request packet as well as controls transmission of a history packet by said history packet transmitter at the beginning of said wait time, wherein said port keeping time detector detects the port keeping time of said communication processor also based on transmission of a history packet by said history packet transmitter, and wherein, in said port keeping time detector, a point in time a packet passed through said history port as the beginning of said wait time is a point in time said history packet was transmitted.

12. The information processing system according to claim 9, wherein a return packet corresponding to said history packet is transmitted while bypassing said history port and a packet that passes through said history port at the beginning of said wait time is said history packet or a return packet corresponding to said request packet, wherein said packet transmission controller controls transmission of said request packet as well as controls said history packet transmitter to engage the history packet transmitter to transmit a history packet at the beginning of a next wait time in case said return packet receiver has failed to receive a return packet corresponding to a request packet, wherein said port keeping time detector detects the port keeping time of said communication processor also based on transmission of a history packet by said history packet transmitter, and wherein, in said port keeping time detector, in case a packet that passes through said history port at the beginning of said wait time is said history packet, a point in time a packet passed through said history port as the beginning of said wait time is a point in time said history packet was transmitted, and in case a packet that passes through said history port at the beginning of said wait time is said return packet, a point in time a packet passed through said history port as the beginning of said wait time is a point in time said return packet was received.

13. The information processing system according to claim 9, wherein a return packet corresponding to said history packet is transmitted via said history port, wherein a packet that passes through said history port at the beginning of said wait time is a return packet corresponding to said history packet, wherein said packet transmission controller controls transmission of said request packet as well as controls transmission of a history packet by said history packet transmitter at the beginning of said wait time, wherein, in said port keeping time detector, a point in time a packet passed through said history port as the beginning of said wait time is a point in time said history packet was transmitted or a point in time a return packet corresponding to said history packet was received.

14. The information processing system according to claim 9, wherein a return packet corresponding to said history packet is transmitted via said history port, wherein a packet that passes through said history port at the beginning of said wait time is a return packet corresponding to said history packet or a return packet corresponding to said request packet, wherein said packet transmission controller controls transmission of said request packet as well as controls said history packet transmitter to engage the history packet transmitter to transmit a history packet at the beginning of a next wait time in case said return packet receiver has failed to receive a return packet corresponding to a request packet, wherein, in said port keeping time detector, in case a packet that passes through said history port at the beginning of said wait time is a return packet corresponding to said history packet, a point in time a packet passed through said history port as the beginning of said wait time is a point in time said history packet was transmitted or a point in time a return packet corresponding to said history packet was received, and in case a packet that passes through said history port at the beginning of said wait time is a return packet corresponding to said request packet, a point in time a packet passed through said history port as the beginning of said wait time is a point in time a return packet corresponding to said request packet was received.

15. The information processing system according to claim 4, wherein said packet transmitter uses a binary search method to determine a wait time based on whether a return packet has been received by said return packet receiver and controls said request packet transmitter to engage the request packet transmitter to transmit a request packet to implement the wait time.

16. The information processing system according to claim 15, wherein said packet transmission controller determines the timing to transmit a request packet so that, in case a return packet corresponding to a transmitted request packet has not been received by said return packet receiver and a return packet corresponding to one or more request packets has been successfully received by said return packet receiver so far, a wait time will be a wait time between a wait time corresponding to the return packet that has not been received and the longest wait time of a return packet, corresponding to a request packet that has been successfully received by said return packet receiver so far, and controls said request packet transmitter to engage said request packet transmitter to transmit a request packet with the timing determined and wherein said packet transmission controller determines the timing to transmit a request packet so that, in case a return packet corresponding to a transmitted request packet has been successfully received by said return packet receiver, and a return packet corresponding to a request packet has not been received by said return packet receiver so far, a wait time will be a wait time between a wait time corresponding to the return packet that has been successfully received and the shortest wait time of a return packet, corresponding to a request packet, that has not been received by said return packet receiver so far, and controls said request packet transmitter to engage said request packet transmitter to transmit a request packet with the timing determined.

17. The information processing system according to claim 15, wherein said packet transmission controller determines the timing to transmit a request packet so that, in case a return packet corresponding to a transmitted request packet has not been received by said return packet receiver and a return packet corresponding to one or more request packets has been successfully received by said return packet receiver so far, a wait time will be a middle wait time between a wait time corresponding to the return packet that has not been received and the longest wait time of a return packet, corresponding to a request packet that has been successfully received by said return packet receiver so far, and controls said request packet transmitter to engage said request packet transmitter to transmit a request packet with the timing determined and wherein said packet transmission controller determines the timing to transmit a request packet so that, in case a return packet corresponding to a transmitted request packet has been successfully received by said return packet receiver, and a return packet corresponding to a request packet has not been received by said return packet receiver so far, a wait time will be a middle wait time between a wait time corresponding to the return packet that has been successfully received and the shortest wait time of a return packet, corresponding to a request packet, that has not been received by said return packet receiver so far, and controls said request packet transmitter to engage said request packet transmitter to transmit a request packet with the timing determined.

18. The information processing system according to claim 15, wherein said packet transmission controller determines the timing to transmit a request packet so that, in case a return packet corresponding to a transmitted request packet has not been received by said return packet receiver and a return packet corresponding to a request packets has not been received by said return packet receiver so far, a wait time will be a wait time shorter than a wait time corresponding to the return packet that has not been received, and controls said request packet transmitter to engage said request packet transmitter to transmit a request packet with the timing determined.

19. The information processing system according to claim 15, wherein said packet transmission controller determines the timing to transmit a request packet so that, in case a return packet corresponding to a transmitted request packet has not been received by said return packet receiver and a return packet corresponding to a request packets has not been received by said return packet receiver so far, a wait time will be half a wait time corresponding to the return packet that has not been received, and controls said request packet transmitter to engage said request packet transmitter to transmit a request packet with the timing determined.

20. The information processing system according to claim 15, wherein said packet transmission controller determines the timing to transmit a request packet so that, in case a return packet corresponding to a transmitted request packet has been successfully received by said return packet receiver and a return packet corresponding to a request packets has always been successfully received by said return packet receiver so far, a wait time will be a wait time longer than a wait time corresponding to the return packet that has been successfully received, and controls said request packet transmitter to engage said request packet transmitter to transmit a request packet with the timing determined 21. The information processing system according to claim 4, wherein
in said port keeping time detector, a point in time a return packet reached said communication processor as the end of said wait time is a point in time a request packet requesting transmission of said return packet was transmitted.

22. The information processing system according to claim 4, wherein
in said port keeping time detector, a point in time a return packet reached said communication processor as the end of said wait time is a point in time said return packet was received.

23. The information processing system according to claim 4, wherein
in said port keeping time detector, a point in time a return packet reached the history port of said communication processor as the end of said wait time is a point in time said return packet was received in case said return packet was successfully received, and a point in time a request packet requesting transmission of the return packet was transmitted in case said return packet was not received.

24. The information processing system according to claim 4, wherein,
in said packet transmission controller, a point in time a return packet reached the history port of said communication processor as the end of said wait time is a point in time a request packet requesting transmission of said return packet was transmitted.

25. The information processing system according to claim 4, wherein
said port keeping time detector detects said port keeping time in case the difference between a wait time corresponding to a request packet transmitted by said request packet transmitter and a wait time corresponding to a request packet transmitted immediately before the request packet has become smaller than a predetermined value.

26. The information processing system according to any one of claims 1 to 3, wherein
said port keeping time detector detects said port keeping time in case said return packet receiver has received a return packet corresponding to a request packet transmitted in the first transmission by said request packet transmitter.

27. The information processing system according to any one of claims 1 to 3, wherein
said port keeping time detector detects said port keeping time in case a request packet has been transmitted a predetermined number of times.

28. The information processing system according to claim 1, wherein
said port keeping time detector detects said port keeping time when a predetermined time has elapsed since processing concerning detection of a port keeping time started.

29. The information processing system according to claim 1, wherein
said history port is assigned anew to said communication processor each time a first history packet passes through the port.

30. An information processor composing the information processing system according to claim 1.

31. A server composing the information processing system according to claim 1.

32. An information processing method used in said information processor composing an information processing system comprising: an information processor; a server; and a communication processor for performing processing related to communications between said information processor and said server; said method including:
a history packet transmitting step of transmitting via a port of said communication processor a history packet as a packet for leaving a transmission history in said communication processor;
a request packet transmitting step of transmitting to said server, via a port different from the history port as the port of said communication processor where said history packet has passed, a request packet as a packet for requesting transmission of a return packet as a packet to be transmitted from said server;
a return packet receiving step of receiving a return packet transmitted from said server via said history port; and
a port keeping time detecting step of detecting the port keeping time of said communication processor based on reception of a return packet in said return packet receiving step; wherein
said method transmits a request packet in said request packet transmitting step by using a binary search method based on reception of a return packet by said return packet receiving step.

* * * * *